United States Patent [19]

Shibano et al.

[11] 4,339,485
[45] Jul. 13, 1982

[54] PRESSURE SENSITIVE ADHESIVE PRODUCTS

[75] Inventors: Tomishi Shibano, Tama; Sachio Maruchi, Tokyo; Koji Yakan, Tanashi; Tadashi Kobayashi, Tokyo; Saburo Akimoto, Yokohama, all of Japan

[73] Assignee: Sanyo-Kokusaku Pulp Co., Ltd., Tokyo, Japan

[21] Appl. No.: 90,605

[22] Filed: Nov. 2, 1979

[30] Foreign Application Priority Data

| Nov. 9, 1978 [JP] | Japan | 53-137350 |
| Dec. 12, 1978 [JP] | Japan | 53-152628 |
| May 18, 1979 [JP] | Japan | 54-60336 |
| May 21, 1979 [JP] | Japan | 54-61513 |

[51] Int. Cl.$^3$ ............................................. A61F 13/02
[52] U.S. Cl. ................................ 428/40; 156/289; 156/334; 156/344; 427/208.4; 428/352; 428/500; 428/516; 428/520; 526/348
[58] Field of Search ............. 428/352, 500, 516, 520, 428/343, 40; 427/208.4; 526/348, 342, 339; 156/289, 344, 334

[56] References Cited

U.S. PATENT DOCUMENTS

| 2,541,498 | 2/1951 | Calvert | 156/344 |
| 4,012,560 | 3/1977 | Baatz et al. | 428/352 |
| 4,124,431 | 11/1978 | Schramer et al. | 428/40 |
| 4,151,319 | 4/1979 | Sackoff et al. | 427/208 X |

OTHER PUBLICATIONS

Chemical Abstract, 83, 194727z (1975).
Modern Plastics Encyclopedia, "Adhesive Bonding", p. 412, vol. 52, No. 10A, 1975-1976.

Primary Examiner—George F. Lesmes
Assistant Examiner—E. Rollins Buffalow
Attorney, Agent, or Firm—Oblon, Fisher, Spivak, McClelland & Maier

[57] ABSTRACT

Pressure sensitive adhesive products or articles having one or more release layers and a pressure sensitive adhesive layer, said one or more release layer comprising a polyolefinic elastomer having a shearing modulus of less than $2.0 \times 10^8$ dyne/cm$^2$ and surface wettability expressed in terms of an equilibrium contact angle of more than 55° with respect to a standard liquid, and said adhesive layer being composed mainly of a polyacrylate. To increase the adhesion between the release layer and a backing substrate, a reinforcing interlayer may be used. As the release layer, a mixture of the polyolefinic elastomer and polyethylene may be used. The release layer is then kept in contact with the adhesive layer over a given area to form a composite or integral layer thereof as by extrusion coating.

11 Claims, 39 Drawing Figures

PRESSURE SENSITIVE ADHESIVE PRODUCTS

BACKGROUND OF THE INVENTION

1. Field of the Invention

The present invention relates to the pressure sensitive adhesive products having a pressure sensitive adhesive layer and one or more release layers. It will be noted that the term "pressure sensitive adhesive products or articles" referred to herein indicates pressure sensitive adhesive-sheets, tapes or double coated tapes.

2. Description of the Prior Art

In most cases, the ordinary pressure sensitive adhesive-sheet or tape is wound upon itself to form a roll for many applications. The pressure sensitive bonding agent is then protected by laminating the agent to the surface of the sheet or tape opposite to that coated therewith or temporarily inserting a release sheet therebetween.

In order to use the sheet or tape, it is first extended from the roll or the release sheet is removed; however, it is required to provide a release layer, as shown in FIG. 1 or 2, so as to facilitate such extension or removal. FIGS. 1 and 2 are sectional views of the pressure sensitive adhesive sheet and tape, respectively.

SUMMARY OF THE INVENTION

The present invention has been accomplished through setting an eye on the fact that satisfactory release property and other properties are afforded to the pressure sensitive adhesive articles wherein the release layer is kept in contact with the pressure sensitive adhesive layer by a specific combination of both layers. Various aspects of the present invention are itemized below:

(i) The present invention is basically characterized by a specific combination of a release layer A exclusively comprising a polyolefinic elastomer a having a predetermined shearing modulus and predetermined surface wettability and a pressure sensitive adhesive layer F composed mainly of a polyacrylate, both being allowed to come in contact with each other. In other words, the invention is characterized by a A-F system.

(ii) The present invention is further characterized in that, in addition to the aforesaid combination, the release layer A and a reinforcing interlayer B for improving the adhesion between the layer A and a backing substrate are coextruded under given conditions to bond the layer A to the substrate through the interlayer B and permit the layer A to be in contact with the layer F, whereby there is a stronger bonding between the layer A and the substrate. In other words, the invention is characterized by a B-A-F system.

(iii) The present invention is still further characterized in that, in place of the release layer A, use is made of a release layer (A+c) comprising a resin mixture (a+c) obtained by adding a specific polyethylene c to the polyolefinic elastomer a, which mixture is permitted to come in contact with the pressure sensitive adhesive layer F to provide more satisfactory releasability and other properties. In other words, the invention is characterized by a (A+c)-F system.

(iv) The aspect (iii) of the present invention and eventually the basic invention defined in the aspect (i) are still further characterized in that the release layer (A+c) and the reinforcing interlayer B for increasing the adhesion between the layer (A+c) and the backing substrate are simultaneously co-extruded under given conditions to bond the layer (A+c) to the substrate through the reinforcing interlayer B and permit the release layer (A+c) to be kept in contact with the pressure sensitive adhesive layer F with a view to provide increased adhesion of the release layer (A+c) to the backing substrate. In other words, the invention is characterized by a B-(A+c)-F system.

BRIEF DESCRIPTION OF THE DRAWINGS

FIGS. 1 and 2 are sectional views of the pressure sensitive adhesive sheet and tape, respectively.

FIG. 3 is a schematic section of the pressure sensitive adhesive double coated tape having release sheets coated on both sides of a backing substrate, and FIG. 5 is a schematic section of the double coated tape having a release sheet on one side of a backing substrate. In either case, the tape has pressure sensitive adhesive layers on its both sides, which layers are kept in contact with the release layers.

FIG. 4 is a perspective view of a roll of the double coated tape of FIG. 3, and FIG. 6 is a perspective view of a roll of the double coated tape of FIG. 5.

FIGS. 7 and 8 are enlarged sectional views of the pressure sensitive adhesive sheets having a release layer A according to the present invention, and FIGS. 9 and 10 are similar views of the pressure sensitive adhesive tapes. FIGS. 7 and 9 illustrate the embodiments wherein no reinforcing interlayer B is needed, whereas FIGS. 8 and 10 are those wherein the interlayer B is required to improve the adhesion between the release layer A and the substrate II.

FIGS. 11 to 22 are enlarged sectional views of typical embodiments of the pressure sensitive adhesive double coated tapes having a release layer A according to the present invention, FIG. 11 illustrates the pressure sensitive adhesive double coated tape including a double faced release sheet having on its both sides the release layers A according to the present invention, which is designed such that, when it is wound upon itself to form a roll, the release layers A are kept in contact with both sides of the adhesive layer F so as to achieve the specific combination in accordance with the present invention. That is to say, this figure shows an enlarged sectional view of the adhesive tape in which the substrate II is coated on its both sides with the release layers A comprising the polyolefinic elastomer a alone, the open side of one of said layers being coated with the polyacrylate-based pressure sensitive adhesive layer F. FIG. 12 shows the pressure sensitive adhesive double coated tape including two release sheets each having on its one side a release layer A, which is designed such that the release layers A are kept in contact with both sides of the pressure sensitive adhesive layer F so as to achieve the specific combination in accordance with the present invention. Namely, FIG. 12 shows an enlarged sectional view of the double coated tape in which the substrate II is coated on its one side with the release layer A comprising the polyolefinic elastomer a alone, and in which the layer A is kept in contact with both sides of polyacrylate-based pressure sensitive adhesive layer F.

FIG. 13 is a view of the pressure sensitive adhesive double coated tape comprising a backing substrate II having on its both sides release layers, one being a release layer A according to the present invention and the other being a silicone release layer I, which tape is designed such that, when it is shaped into a roll, one side of the pressure sensitive adhesive layer F comes in contact with the release layer A and the other side is in contact with the silicone release layer I. Thus, FIG. 13 shows an enlarged sectional view of the double coated tape in which the substrate II is coated on its one side with the release layer A and on the other side with the silicone release layer I to form a release sheet, and in which the release layer A in the release sheet comes in contact with the polyacrylate-based pressure sensitive adhesive layer F.

FIG. 14 illustrates the pressure sensitive adhesive double coated tape prepared by allowing a release layer A according to the present invention to come in contact with one side of a pressure sensitive adhesive layer F and a silicone release layer I to come in contact with the other side. Thus, this figure is an enlarged sectional view of the double coated tape in which the release layer A comprising a polyolefinic elastomer a alone and coated onto one side of a backing substrate II is allowed to come in contact with one side of the polyacrylate-based pressure sensitive adhesive layer F and the silicone release layer I formed on the other side of the substrate II is allowed to be in contact with the other side of the layer F. FIG. 15 is a similar view of FIG. 13, provided however that the pressure sensitive adhesive layer of FIG. 13 is composed of an integral layer VIII comprising the polyacrylate layer F and a non-polyacrylate layer IV, and that the silicone layer I is permitted to be in contact with the non-polyacrylate layer IV. FIG. 16 is a similar view of FIG. 14, except that the pressure sensitive adhesive layer F of FIG. 14 is formed of an integral layer VIII comprising the polyacrylate layer F and a non-polyacrylate layer I, and the silicone layer I is allowed to be in contact with the non-polyacrylate layer IV.

FIG. 17 is a similar view of FIG. 11, provided that a reinforcing interlayer B is provided between a release layer A according to the present invention and a backing substrate II.

Between FIGS. 18 and 12, FIGS. 19 and 13, FIGS. 20 and 14, FIGS. 21 and 15 and FIGS. 22 and 16, there are the same relationships as between FIGS. 17 and 11; FIGS. 18, 19, 20, 21 and 22 are enlarged sectional views similar to the corresponding views.

FIGS. 23 and 24 are enlarged sectional views of the pressure sensitive adhesive sheets having a release layer A+c according to the present invention, and FIGS. 25 and 26 are similar views of the pressure sensitive adhesive tapes. FIGS. 23 and 24 illustrate the embodiments wherein no reinforcing interlayer B is needed, whereas FIGS. 25 and 26 are those wherein the interlayer B is required to improve the adhesion between the release layer and the substrate II.

FIGS. 27 to 38 are enlarged sectional views of typical embodiments of the pressure sensitive adhesive double coated tapes having a release layer A+c according to the present invention. FIG. 27 illustrates the pressure sensitive adhesive double coated tape including a double faced release sheet having on its both sides the release layers A+c according to the present invention, which is designed such that, when it is wound upon itself to form a roll, the release layers A+c are kept in contact with both sides of the adhesive layer F so as to achieve the specific combination in accordance with the present invention. That is to say, this figure is an enlarged sectional view of the adhesive tape in which the substrate II is coated on its both sides with the release layers A+c comprising the polyolefinic elastomer/polyethylene mixture a+c, the open side of one of layers being coated with the polyacrylate-based pressure sensitive adhesive layer F. FIG. 28 shows the pressure sensitive adhesive double coated tape including two release sheets each having on its one side a release layer A+c, which is designed such that the release layers A+c are kept in contact with both sides of the pressure sensitive adhesive layer F so as to achieve the specific combination in accordance with the present invention. Namely, FIG. 28 is an enlarged sectional view of the double coated tape in which the substrate II is coated on its one side with the release layer A+c comprising the polyolefinic elastomer/polyethylene mixture a+c, and in which the layer A+c are kept in contact with both sides of the polyacrylate-based pressure sensitive adhesive layer F.

FIG. 29 illustrates the pressure sensitive adhesive double coated tape comprising a backing substrate II having on its both sides release layers, one being a release layer a+c according to the present invention and the other being a silicone release layer I, which tape is designed such that, when it is shaped into a roll, one side of the pressure sensitive adhesive layer F comes in contact with the release layer A+c and the other side is in contact with the silicone release layer I. Thus, FIG. 29 is an enlarged sectional view of the double coated tape in which the substrate II is coated on its one side with the release layer and on the other side with the silicone release layer I to form a release sheet, and in which the release layer in the release sheet comes in contact with the polyacrylate-based pressure sensitive layer F.

FIG. 30 illustrates the pressure sensitive adhesive double coated tape prepared by allowing a release layer A+c according to the present invention to come in contact with one side of a pressure sensitive adhesive layer F and a silicone release layer I to come in contact with the other side. Thus, this figure is an enlarged sectional view of the double coated tape in which the release layer A+c comprising a polyolefinic elastomer/polyethylene mixture a+c and coated onto one side of a backing substrate II is allowed to come in contact with one side of the polyacrylate-based pressure sensitive adhesive layer F and the silicone release layer I formed on the other side of the substrate II is allowed to be in contact with the other side of the layer F. FIG. 31 is a similar view of FIG. 29, provided that the pressure sensitive adhesive layer of FIG. 29 is composed of an integral layer VIII comprising the polyacrylate layer F and a non-polyacrylate layer and that the silicone layer I is permitted to be in contact with the non-polyacrylate layer IV. FIG. 32 is a similar view of FIG. 30 except that the pressure sensitive adhesive layer F of FIG. 30 is formed of an integral layer IV, and that the silicone layer I is permitted to be in contact with the non-polyacrylate layer IV.

FIG. 33 is a similar view of FIG. 27, provided that a reinforcing interlayer B is provided between the release layer A—c according to the present invention and a backing substrate II.

Between FIGS. 34 and 28, FIGS. 28 and 25, FIGS. 36 and 30, FIGS. 37 and 31 and FIGS. 38 and 32, there are the same relationships as between FIGS. 33 and 27; FIGS. 34, 35, 36, 37 and 38 are enlarged sectional views similar to the corresponding views.

Figure 1:
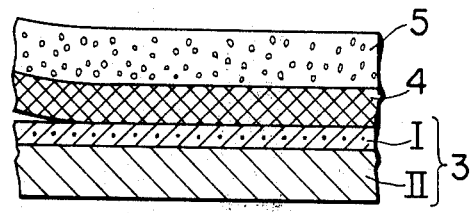
FIGS. 1 to 6 illustrate the conventional articles.
Figure 2:
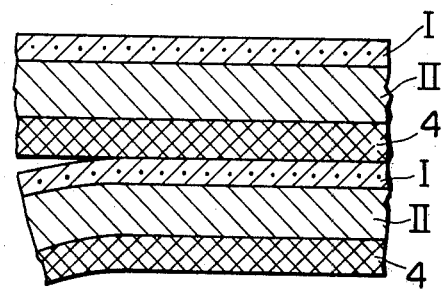

In the drawings, reference marks or numerals have the following means:
I: Silicone release layer used in the prior art
II: Substrate
3: Release sheet wherein the substrate is coated on its one side with silicone
4: Pressure sensitive adhesive layer (F)
5: Surface material
6: Double faced release sheet wherein the substrate is coated on its both sides with release layers of silicone etc.
A: Release layer comprising polyolefinic elastomer alone
F: Polyacrylate-based pressure sensitive adhesive layer
III: Release sheet wherein the substrate is coated on its side with the release layer A according to the present invention
B: Reinforcing interlayer
V: Release sheet wherein the substrate is coated on its side with release layer A according to the present invention through reinforcing interlayer B according to the present invention
VI: Double faced release sheet wherein the substrate is coated on its both sides with release layers A according to the present invention
VII: Release sheet wherein the substrate is coated on its one side with release layer A of the present invention and on the other side with silicone release layer I
VIII: Pressure sensitive adhesive layer composed of polyacrylate-based pressure sensitive adhesive layer F and non-polyacrylate-based pressure sensitive adhesive layer IV
IX: Double faced release sheet wherein the substrate is coated on its both sides with release layers A according to the present invention through reinforcing interlayer B according to the present invention
X: Double faced release sheet wherein substrate II is coated on its one side with release layer B of the present invention through reinforcing interlayer B of the present invention and on the other side with silicone release layer I
XVIII: Non-polyacrylate based pressure sensitive adhesive layer
A—c: Release layer comprising polyolefinic elastomer/polyethylene mixture
F: Release sheet wherein substrate II is coated on its one side with release layer A+c of the present invention
XI: Release sheet wherein substrate II is coated on its side with release layer A+c according to the present invention through reinforcing interlayer B according to the present invention
XIII: Double faced release sheet wherein substrate II is coated on its both sides with release layers A—c according to the present invention
XIX: Release sheets wherein substrate II is coated on its one side with release layer A+c and on the other side with silicone release layer I
XV: Double faced release sheet wherein substrate II is coated on its both sides with release layers A+c according to the present invention through reinforcing interlayer B of the present invention
IV: Non-polyacrylate-based pressure sensitive adhesive layer

DETAILED DESCRIPTION OF THE INVENTION

Figure 3:
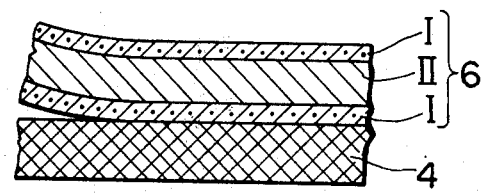
Figure 5:
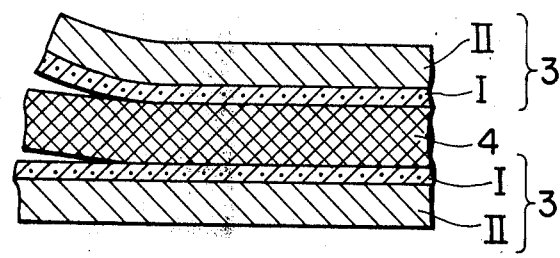

As illustrated in FIGS. 3 and 5, the pressure sensitive adhesive double coated tape is constructed such as to facilitate its extension and provide easy peeling and removal of the release sheet. Thus, FIG. 3 is a schematic section of the double coated tape having release sheets coated on both sides of the backing substrate, and FIG. 5 is a schematic section of the double coated tape having a release sheet on one side of the backing substrate. In either case, the tape has pressure sensitive adhesive layers on its both sides, which layers are kept in contact with the release layer.

Figure 4:
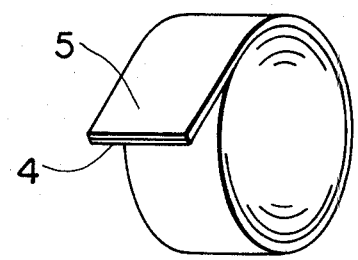
Figure 6:
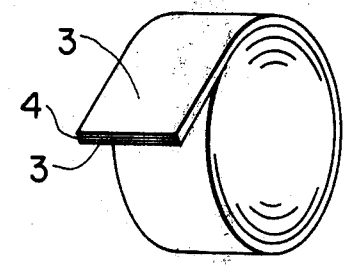

FIG. 4 is perspective view of a roll of the double coated tape of FIG. 3, and FIG. 6 is a perspective view of a roll of the double coated tape of FIG. 5.

In these drawings, numeral 1 stands for a conventional release layer formed of silicone etc., 2 for a backing substrate, 3 for a release sheet comprising a substrate having on its one side a release layer I formed of silicone etc., 4 for a pressure sensitive adhesive layer, 5 for a surface material, and 6 for a release sheet having on its both sides release layers I formed of silicone etc.

The pressure sensitive adhesive layer in the double coated tape may or may not contain a core sheet made of Japanese paper, a non-woven backing or a plastic film.

It will be noted that the double coated tapes are used not only in the form of a roll as shown in FIGS. 4 and 6, but also in the form of a sheet.

In most cases, the aforesaid prior art pressure sensitive adhesive-sheets, tapes and double coated tapes generally employ a silicone-made release layer; however, it has been found that the use of silicone offers the following problems:

(a) When the pressure sensitive adhesive is coated on the release layer during the production of pressure sensitive adhesive-sheets, tapes and double coated tapes, repelling of the adhesive takes place on the application surface with the result that an unsatisfactory adhesive layer is obtained.

(b) When the pressure sensitive adhesive used in the pressure sensitive adhesive sheet has a relatively low bond strength, the sheet peels spontaneously from the release layer due to the excessive releasability of silicone prior to its use. As a result, the protective function that the release layer must originally possess with the respect to the pressure sensitive adhesive layer is eliminated to such an extent that the surface of the pressure sensitive adhesive is contaminated.

(c) With the pressure sensitive adhesive tape, difficulties are encountered in superposing the tape upon itself due to the excessive releasability of silicone.

(d) With the pressure sensitive adhesive tape, its back (i.e., the release or silicone surface) shows poor (Magic) inkreceptible property due to its tendency toward repelling.

(e) A corrugated box or the like article may be sealed with the pressure sensitive adhesive tape. When a number of such boxes are stacked, however, they are apt to collapse due to the slipping property afforded by the back, i.e., silicone surface fo the tape.

(f) In most cases, the pressure sensitive adhesive used in the pressure sensitive adhesive double coated tape is of high coherent strength but relatively low bond strength and hence of excessive releasbility. This leads to easy peeling of the adhesive layer from the release layer with the result that the surface of the pressure sensitive adhesive is contaminated.

(g) In the pressure sensitive adhesive double coated tape, it is required that the release property be controlled depending upon the purpose so as to provide easy extension and application of the tape. When use is made of silicone, a releasability-controlling agent may be added thereto so as to adjust the releasability to a proper level. Even in this case, the releasability is apt to vary depending upon the coating conditions of silicone and with the lapse of time.

(h) The pressure sensitive adhesive double coated tape usually makes use of the thermal setting type of silicone for the release layer, although the same is true of the pressure sensitive adhesive sheet or the like article. However, part of unreacted low-molecular silicone passes easily into the pressure sensitive adhesive layer, resulting in a lowering of the adhesion thereof. Such a tendency is especially pronounced when adjustment of the releasability is required.

(i) The pressure sensitive adhesive double coated tape sometimes may be finished such that the tape is wound upon itself in a state where its width is made narrow, thereby forming a tape roll. When a long tape is used in this case, a shifting often takes place between the release layer and the adhesive layer so that the tape rises telescopically. As a result, it is difficult to keep the tape roll in the desired from. Such a tendency becomes marked as the tape width is made narrower. Besides the silicone, as the release layer use is sometimes made of polyethylene, polyvinyl chloride, polyvinyl acetate, alkyd resin etc. Such plastic materials are disadvantageous in that they are of releasability insufficient for use in the release layer. For example, when such plastic materials are used in the pressure sensitive adhesive tape having a backing substrate of paper, there is a fear that the paper splits due to the poor release property in the course of extending the tape. Accordingly, a troublesome step of increasing the resistance of the paper to splitting is needed. It has also been proposed to reduce the contact area of the adhesive layer and the release layer formed of plastic materials other silicone and having a somewhat great degree of releasability; however, no satisfactory results are still obtained.

Reference will now be made to the aspects (i) and (ii) of the present invention. As a consequence of through investigations made with a view to eliminating the aforesaid problems, it has been found that, in the pressure sensitive adhesive products or articles, such as pressure sensitive adhesive-sheets, tapes and double coated tapes etc., the problems attendant with the use of silicone are entirely solved by using for a release layer A a polyolefinic elastomer a having a shearing modulus of less than $2.0 \times 10^8$ dyne/cm$^2$ and wettability expressed in terms of an equlibrium contact angle of more than 55° with respect to a standard liquid having a surface tension of 50 dyne/cm and used according to JIS K 6768 in place of the silicone and employing a pressure sensitive adhesive composed mainly of polyacrylates for a pressure sensitive adhesive layer kept in contact with the release layer A.

The present invention underlying the finding mentioned just above provides a pressure sensitive adhesive product having a novel release layer A that affords a satisfactory adhesive application surface causing no repelling and that, due to its proper degree of releasability, exhibits better superposable, ink-receptible and non-slipping characteristics without offering problems such as spontaneous peeling of the pressure sensitive adhesive sheet from the release layer prior to its use. When this release layer is practically used in the pressure sensitive adhesive double coated tape, there is obtained a proper degree of stable releasability that is hardly influenced by the coating conditions and the lapse of time without presenting problems such as spontaneous peeling of the pressure sensitive adhesive layer from the release layer prior to it use. In addition, when the adhesives in the pressure sensitive adhesive layer come in contact with the release layer, neigher lowering of the adhesion nor deviation take place therebetween.

The aspect (ii) of the present invention will now be explained. In some cases, the release layer is coated onto a backing substrate by extrusion. If the backing substrate is formed of a polyolefin film, a polyester film or a metal foil, then satisfactory degree of adhesion is obtained between the release layer and the substrate; however, the backing substrate such as paper or fabric is often found to exhibit poor adhesion relative to the release layer A coated by extrusion. As a result of exhaustive studies made on the method for applying the release layer A, i.e., for coating it onto the substrate by extrusion for the purpose of solving this problem, it has been made clear that the problem can be eliminated by providing a step for simultaneous co-extrusion of a resin material b forming a reinforcing interlayer B for increasing the adhesion relative to the substrate in addition to the step of forming the release layer A of the polyolefinic elastomer a. In this case, it is required that the co-extrusion coating be effected such that the pressure sensitive adhesive layer F composed mainly of polyacrylates comes in contact with the polyolefinic elastomer a, and that the polyolefinic elastomer a be coated onto the substrate through the reinforcing interlayer B.

In other words, the present invention is characterized by a specific combination of the polyolefinic elastomer a forming a release layer in the pressure sensitive adhesive sheet or tape or at least one of release layers in the pressure sensitive adhesive double coated tape and having a shearing modulus and wettability as defined in the foregoing with the polyacrylate forming a main part of the pressure sensitive adhesive layer F to be in contact with the release layer A.

When forming the release layer A, the co-extrusion coating of the release layer A and the interlaying B may be effected at the same time to obtain a more unique product. FIGS. 7 to 22 are enlarged sectional views of typical embodiments of the pressure sensitive adhesive products having a release layer A comprising the polyolefinic elastomer a alone according to the present invention.

Figure 7:
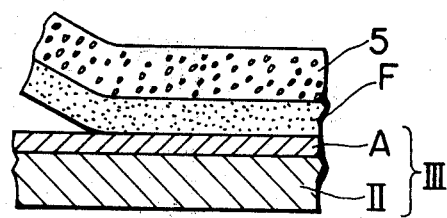
FIGS. 7 to 22 are enlarged sectional views of typical embodiments of the pressure sensitive adhesive products having a release layer A comprising the polyolefinic elastomer a alone according to the present invention.
Figure 8:
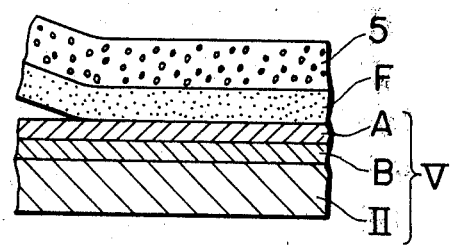
Figure 9:
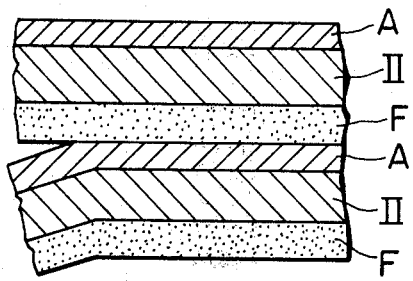
Figure 10:
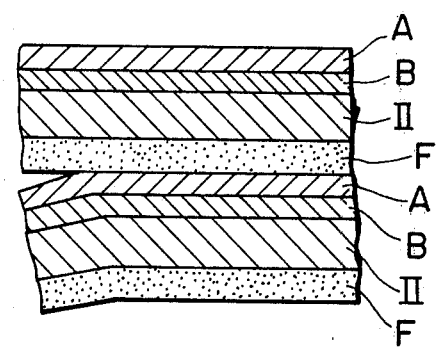

FIGS. 7 and 8 are enlarged sectional views of the pressure sensitive adhesive sheets having a release layer A according to the present invention, and FIGS. 9 and 10 are similar views of the pressure sensitive adhesive tapes. FIGS. 7 and 9 illustrate the embodiments wherein no reinforcing interlayer B is needed, whereas FIGS. 8 and 10 are those wherein the interlayer B is required to improve the adhesion between the release layer A and the substrate II.

Figure 11:
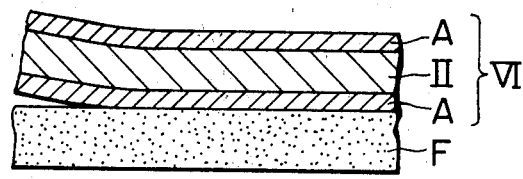
Figure 12:
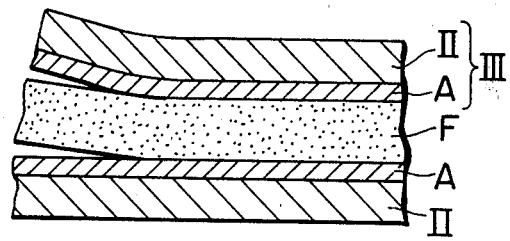

FIGS. 11 to 22 are enlarged sectional views of typical embodiments of the pressure sensitive adhesive double coated tapes having a release layer A according to the present invention. FIG. 11 illustrates the pressure sensitive adhesive double coated tape including a double faced release sheet having on its both sides the release layers A according to the present invention, which is designed such that, when it is wound upon itself to form a roll, the release layers A are kept in contact with both sides of the adhesive layer F so as to achieve the specific combination in accordance with the present invention. This is to say, this figure is an enlarged sectional view of the adhesive tape in which the substrate II is coated on its both sides with the release layers A comprising the polyolefinic elastomer a alone, the open side of one of said layers being coated with the polyacrylate-based pressure sensitive adhesive layer F. FIG. 12 shows the pressure sensitive adhesive double coated tape including two release sheet each having on its one side a release layer A, which is designed such that the release layers A are kept in contact with both sides of the pressure sensitive adhesive layer F so as to achieve the specific combination in accordance with the present invention. Namely, FIG. 12 is an enlarged sectional view of the double coated tape in which the substrate II is coated on its one side with the release layer A comprising the polyolefinic elastomer a alone, and in which the layer A is kept in contact with both sides of the polyacrylate-based pressure sensitive adhesive layer F.

Figure 13:
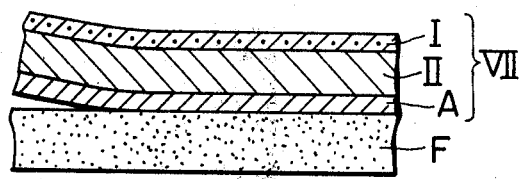

FIG. 13 illustrates the pressure sensitive adhesive double coated tape comprising a backing substrate II having on its both sides release layers, one being a release layer A according to the present invnetion and the other being a silicone release layer I, which tape is designed such that, when it is shaped into a roll, one side of the pressure sensitive adhesive layer F comes in contact with the release layer A and the other side is in contact with the silicone release layer I. Thus, FIG. 13 is an enlarged sectional view of the double coated tape in which the substrate II is coated on its one side with the release layer A and on the other side with the silicone release layer I to form a release sheet, and in which the release layer A in the release sheet comes in contact with the polyacrylate-based pressure sensitive adhesive layer F.

Figure 14:
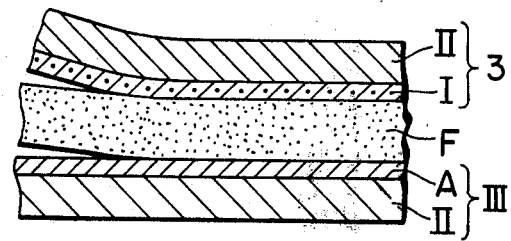
Figure 15:
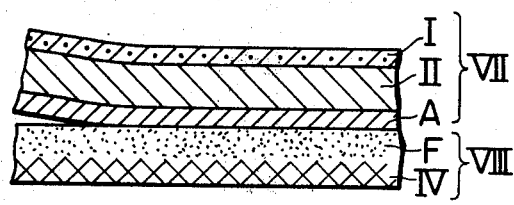
Figure 16:
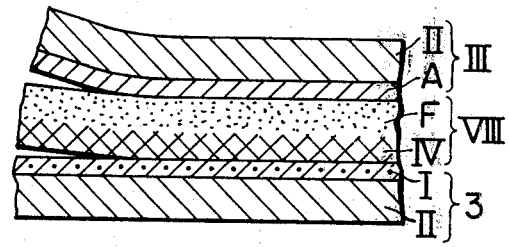

FIG. 14 illustrates the pressure sensitive adhesive double coated tape prepared by allowing a release layer A according to the present invention to come in contact with one side of a pressure sensitive adhesive layer F and a silicone release layer I to come in contact with the other side. Thus, this figure is an enlarged sectional view of the double coated tape in which the release layer A comprising a polyolefinic elastomer a alone and coated onto one side of a backing substrate II is allowed to come in contact with one side of the polyacrylate-based pressure sensitive adhesive layer F and the silicone release layer I formed on the other side of the substrate II is allowed to be in contact with the other side of the layer F. FIG. 15 is a similar view of FIG. 13, provided that the pressure sensitive adhesive layer of FIG. 13 is composed of an integral layer VIII comprising the polyacrylate layer F and a non-polyacrylate layer IV, and that the silicone layer I is permitted to be in contact with the non-polyacrylate layer IV. FIG. 16 is a similar view of FIG. 14, except that the pressure sensitive adhesive layer F of FIG. 14 is formed of an integral layer VIII comprising the polyacrylate layer F and a non-polyacrylate layer IV, and that the silicone layer I is permitted to be in contact with the non-polyacrylate layer IV.

Figure 17:
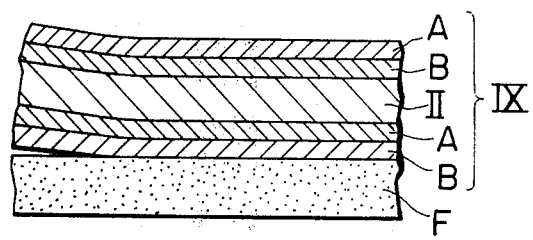
Figure 18:
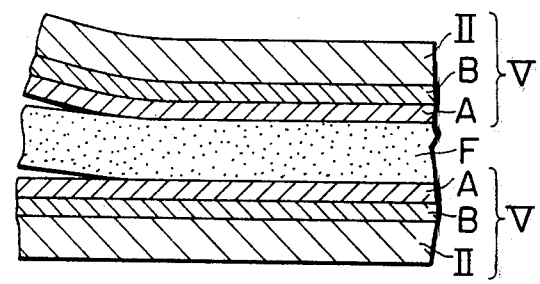
Figure 19:
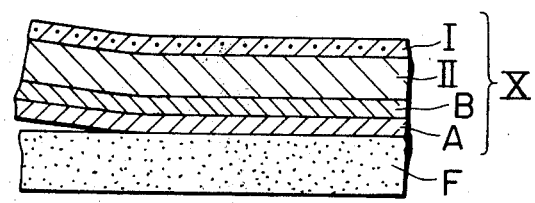
Figure 20:
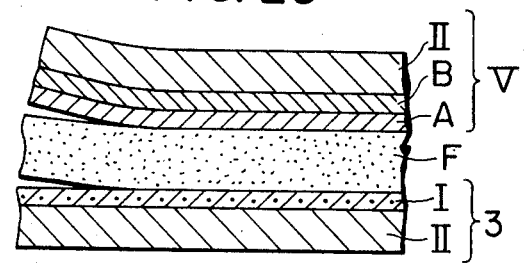
Figure 21:
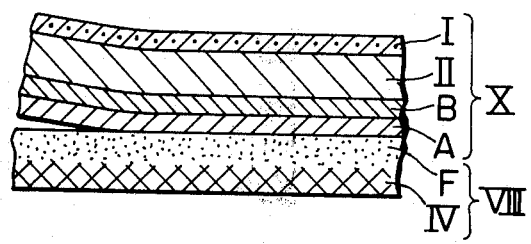
Figure 22:
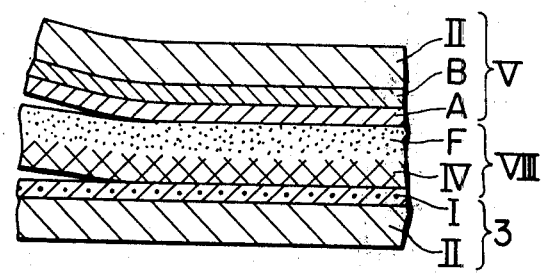

FIG. 17 is a similar view of FIG. 11, provided that a reinforcing interlayer B is provided between a release layer A according to the present invention and a backing substrate II.

Between FIGS. 18 and 12, FIGS. 19 and 13, FIGS. 20 and 14, FIGS. 21 and 15 and FIGS. 22 and 16, there are the same relationships as between FIGS. 17 and 11; FIGS. 18, 19, 20, 21 and 22 are enlarged sectional views similar to the corresponding views.

In the drawings, the reference marks have the following means:
A: Release Layer Comprising Polyolefinic Elastomer Alone
F: Polyacrylate-Based Pressure Sensitive Adhesive Layer
III: Release Sheet Wherein The Substrate Is Coated On Its Side With The Release Layer A According To The Present Invention
B: Reinforcing Interlayer
V: Release Sheet Wherein The Substrate Is Coated On Its Side With Release Layer A According To The Present Invention Through Reinforcing Interlayer B According To The Present Invention
VI: Double Faced Release Sheet Wherein The Substrate Is Coated On Its Both Sides With Release Layers A According To The Present Invention
VII: Release Sheet Wherein The Substrate Is Coated On Its One Side With Release Layer A Of The Present Invention And On The Other Side With Silicone Release Layer I
VIII: Pressure Sensitive Adhesive Layer Composed of Polyacrylate-Based Pressure Sensitive Adhesive Layer F And Non-Polyacrylate-Based Pressure Sensitive Adhesive Layer IV
IX: Double Faced Release Sheet Wherein The Substrate Is Coated On Its Both Sides With Release Layers A According To The Present Invention Through Reinforcing Interlayer B Of The Present Invention
X: Double Faced Release Sheet Wherein Substrate II Is Coated On Its One Side With Release Layer B Of The Present Invention Through Reinforcing Interlayer B Of The Present Invention And On The Other Side With Silicone Release Layer I
XVIII: Non-Polyacrylate-Based Pressure Sensitive Adhesive Layer The aspect (i) of the present invention will now be explained in detail.

As a release layer in the present invention, use is made of the polyolefinic elastomer a having a shearing modulus of less than $2.0 \times 10^8$ dyne/cm$^2$ that is determined at $23° \pm 2°$ C. and $50 \pm 5\%$ RH according to JIS K 7213 test and surface wettability expressed interms of an equilibrium contact angle of more than 55° relative to a standard liquid having a surface tension of 50 dyne/cm and used in JIS K 6768 test. The reason for placing limitation on the shearing modulus and the wettability is based on the following facts found as a consequence of investigations made on the relationship between the releasability of the pressure sensitive adhesive products and the physical properties of the polyolefinic elastomer a which forms the release layer A.

1. The lower the shearing modulus of the polyolefinic elastomer a which forms the release layer, the higher the releasability will be.

2. The larger the contact angle to the surface of the polyolefinic elastomer a relative to a liquid, the higher the releasability will be.

3. The polyolefinic elastomer a which excels in releasability is that having a shearing modulus of less than $2.0 \times 10^8$ dyne/cm$^2$ and surface wettability expressed in terms of an equilibrium contact angle of more than 55° relative to a standard liquid having a surface tension of 50 dyne/cm and used in JIS K 6768 test. Satisfactory are other characteristics required for the release layer in the pressure sensitive adhesive tape or sheet, such as pressure sensitive adhesive coating-, ink receptible- and non-slipping characteristics. This elastomer also affords to the release layer in the pressure sensitive adhesive double coated tape various characteristics required therefor, such as pressure sensitive adhesive coating characteristic, stable releasability and characteristic features that the release layer has no adverse influence on the pressure sensitive adhesive and a shifting of the adhesive layer from the release layer hardly takes place.

Since the pressure sensitive adhesive layers and the release layer in the double coated tape comes in contact with each other over two areas, the method for using such a tape is more complicated than that for using a pressure sensitive adhesive sheet or tape. For this reason, full explanation will given to the pressured sensitive adhesive double coated tape of the present invention.

In the double coated tape, the pressure sensitive adhesive layer is sandwiched between two release layers and comes in contact therewith.

Unlike the pressure sensitive adhesive double coated tape, on the other hand, the ordinary pressure sensitive adhesive tape has a constructional unit comprising a release layer/backing substrate/pressure sensitive adhesive layer system with the adhesive layer being brought in close contact with the substrate on its one side. This tape sticks merely to an application surface on the other side since the adhesion properties are produced only by the side.

That is to say, the pressure sensitive adhesive double coated tape is different from the ordinary pressure sensitive adhesive tape in that the former exhibits adhesion on both sides of the pressure sensitive adhesive layer and can, therefore, stick to an application surface on two surfaces.

In using the pressure sensitive adhesive double coated tape in an ordinary manner, one release layer is first peeled from the pressure sensitive adhesive layer which is in turn applied onto an application surface X, and the other release layer is then stripped from the adhesive layer which is in turn applied onto another application surface Y. In most cases, a somewhat great peel force sould frequently be exercised between the other release layer and the adhesive layer. Application of such a peel force, which is characteristic of the pressure sensitive adhesive double coated tape, is not encountered in the use of the ordinary pressure sensitive adhesive tapes.

Expecially when the core sheet is made extremely thin or removed so as to render the pressure sensitive adhesive layer thin, a film strength of the adhesion layer is so small that unless both release layers are largely different in releasability from each other, it is impossible to completely peel them from the adhesive layer. In this case, one of the release layers should have a proper level, preferably somewhat great level of releasability, although the other release layer may be formed of the silicone designed for use in the conventional release paper.

Thus, it is often required that one surface of the release layer in the pressure sensitive adhesive double coated tape be of smaller releasability while the other surface be of larger releasability. When use is made of the conventional silicone for the release paper, especially the silicone added with a release-controlling agent, there are still some problems such as the aforesaid (g) and (h).

In the prior art pressure sensitive adhesive double coated tape, the silicone added with a release-controlling agent is used for the surface to which a somewhat great level of releasability is provided. However, difficulties are encountered in obtaining a properly adjusted level of releasability. In addition, an unreacted low-molecular part of the silicone posseses easily into the pressure sensitive adhesive layer, resulting in a lowering of the adhesion.

Furthermore, polyethylene, polyvinyl chloride, Teflon or the like material are sometimes used for the surface to which a somewhat great level of releasability is provided in place of the silicone added with a release-controlling agent. Due to the somewhat great level of releasability, however, there is a fear that the adhesive layer tears in peeling the release layer from the adhesive layer upon adhering to an application article X even though the contact area between them is reduced. In some cases, the adhesive layer is not transferred to the application article, and when the article X is a sheet of paper, the paper itself may tear.

In this case, a composite layer comprising the release layer kept in contact with the pressure sensitive adhesive layer according to the present invention is provided to the surface having a somewhat great level of releasability and the prior art silicone is used for the surface having a smaller level of releasability, whereby a difference in the releasability between both surfaces is properly adjusted and an ideal pressure sensitive adhesive double coated tape can be prepared, which tape suffers no lowering of the adhesion.

The present invention has been found to be most effective in the case where no or very thin core sheet is used. This is because the pressure sensitive adhesive layer is of extremely low film strength.

The release layer according to the present invention is usually applied to the surface to which a somewhat great level of releasability is provided.

When two release layers to be in contact with the pressure sensitive adhesive layer are formed of the polyolefinic elastomer a according to the present invention and the adhesive layer is formed of the polyacrylate-based pressure sensitive adhesive f, it has been found that the release property is controlled to a proper degree without causing repelling to occur during the coating of the pressure sensitive adhesive and the adhesion to the adhesive layer to drops as in the case of using silicone as the release layer, thus resulting in the preparation of an ideal pressure sensitive adhesive double coated tape.

It has also been found that this tendency is pronounced especially when the polyacrylate-based pressure sensitive adhesive f is of high cohesion but of low bond strength.

The pressure sensitive adhesive double coated tape is often finished such that it width is made narrow to meet the desired purpose and/or the economical requirements. In the conventional pressure sensitive adhesive double coated tape using the release layer formed of silicone, a shifting is prone to take place between the adhesive layer and the release layer to cause the tape to rise telexcopically, so that it collapses even upon receiving a slight impact. Thus, it is very difficult to make a tape roll having considerable length. However, it has been found in the present invention that no substantial shifting occurs between the adhesive layer and the release layer, and that since no shifting is caused between the adhesive layer and the release layer in a tape roll having a considerable length but a smaller width, the tape roll will hardly collapse.

Thus, it has been found that the present invention renders it possible to wind a tape having a considerable length but a smaller width upon itself to form a tape roll, save the amount of the tape used as compared with the prior art, make improvements in workability and bond the tape to a small spot.

When polyethylene, polyvinyl chloride, Teflon or the like material are coated as the release layers onto both surfaces, some problems such as unfavorable stretching of the tape from a tape roll, tearing of the release sheet or destruction of the adhesive layer arise due to the great release property in addition to the problems associated with the application thereof to the surface which requires a somewhat great level of releasability. Accordingly, it is virtually required to provide excessively increased strength to the release sheet or the adhesive layer, or increase the thickness thereof a level higher than required. As a result, when such a tape is applied to an application surface of a film or a sheet of paper, the application surface neither looks fine externally nor can clearly be printed due to the fact that the tape is very thick. In addition, such a tape is high in production cost.

The polyolefinic elastomer a used as the release layer in the pressure sensitive adhesive products may be a polymer or mixture of two or more polymers. In either case, it is important that the shearing modulus is less than $2.0 \times 10^8$ dyne/cm$^2$, and that the surface wettability expressed in terms of an equilibrium contact angle with respect to a standard liquid is more than 55°, said liquid having a surface tension of 50 dyne/cm and used in JIS K 6768 test. The polyolefinic elastomers that meet the requirements as defined just above include ethylene-alpha olefin copolymers having a density of 0.80 of 0.90 g/cm$^3$, a melting point of lower than 80° C., a brittle temperature of lower than −70° C. according to ASTM D 746 test and a hardness of lower than 70 according to JIS K 6301 test. In this connection, it should be noted that the ethylene-alpha olefin copolymers free from the phyzcial properties as difined just above, for instance those having a brittle temperature of no less than −70° C. or a melting point of no less than 80° C. exhibit considerably poor releasability and is, therefore, of practical useless.

The ethylene-alpha olefin copolymers used in the present invention include copolymers comprising two or more alpha olefins such as ethylene, propylene, 1-butene, 1-pentene, 3-methyl-1-butene, 1-hexane, 3-methyl-1-pentene, 4-methyl-1-pentene, etc., or a mixture thereof. Among others, preferred are a random copolymer of ethylene-1-butene and a copolymer of ethylene/propylene or a mixture thereof.

In addition to the above-mentiioned components, the polyolefinic elastomers a according to the present invention may contain polyolefin waxes and olefinic copolymers having a crystallinity of less than 30% and graft-modifies by unsaturated carboxylic acids or their derivatives without departing from the ranges as above difined on the shearing modulus and surface wettability. As the polyolefin waxes, use may be made of wax obtained by polymerization of ethylene or propylene or wax obtained by thermal cracking of ethylene or propylene. As the olefin copolymers having a crystallinity of less than 30%, mentioned are copolymers comprising two or more alpha olefins such as ethylene, propylene, 1-butene, 1-pentene, 3-methyl-1-butene, 1-hexane, 3-methyl-1-pentene, 4-methyl-1-penten etc., or a mixture thereof, said copolymers being graft-modified by unsaturated carboxylic acids or their derivatives.

In addition to the above-mentioned components, the polyolefinic elastomers a may further contain dyes, pigments, weathering stabilizers, thermal stabilizers, anti-blocking agents, lubricants, antistatic agents, plasticzers, crosslinkers ets., without departing from the ranges as defined on shearing modulus and wettability in the present invention.

The pressure sensitive adhesive layer used in the present invention is limited to the pressure sensitive adhesive f composed mainly of a polyacrylate. The reason for placing limitation on the kind of adhesives is based on the following facts found as a result of investigations made on the relationship between the release property of the polyolefinic elastomer a and the kind of pressure sensitive adhesives.

(1) The release effect of the polyolefinic elastomer a varies largely depending upon the kind of pressure sensitive adhesives.

(2) A markedly satsifactory release property that the polyolefinic elastomer a possesses is obtained in a combination thereof with the pressures sensitive adhesives composed mainly of a polyacrylate.

(3) No satisfactory release effect is obtained in a combination of the elastomer a with other pressure sensitive adhesives, or natural rubber- or vinyl ether-based pressure sensitive adhesives, the latter two being widely used.

The polyacrylate-based pressure sensitive adhesive f used in the present invention, which contains as a main component a polyacrylic acid ester, may be comprised of a polyacrylate alone or a mixture thereof with less than 25% of a vinyl monomer such as vinyl acetate, vinylidene chloride, methacrylate, acrylic acid, methacrylic acid etc. As the polyacrylates, esters of methyl, ethyl, butyl, 2-ethylhexyl etc. are generally used. If required, the polyacrylate-based pressure adhesive f may contain tackifiers, plasticizers, fillers, resistance-to-aging agents, crosslinkers, inorganic or organic fibers and the like substances.

The backing substrate used in the present invention includes, for example, paper, non-woven fabric, cloth, cellophane, non-stretched and (uniaxially or biaxially) stretched polymer films, or metal foils or a composite system thereof.

The pressure sensitive adhesive layer F in the pressure sensitive adhesive double coated tape of the present invention may or may not contain a core sheet. When one of the two groups of release/adhesive systems per unit of the pressure sensitive adhesive double coated type is based on the present invention, the surface of the pressure sensitive adhesive layer according to the present invention may be formed of the adhesive f composed mainly of the polyacrylic acid ester, whereas the opposite surface may be constructed of adhesives not containing the polyacrylic acid ester as a main component. The core sheet which may be used in the present invention is formed of paper, non-woven fabric, cloth, non-stretched and (uniaxially or biaxially) stretched polymer films and expanded sheets thereof, metal foils, inorganic fiber sheets, carbon fiber sheets, metal fiber sheets or a composite system thereof.

Concrete embodiments of the aspect (i) of the present invention will now be explained. According to the aspect, the release layer A comprising the polyolefinic elastomer a is first formed on a backing substrate in a conventional manner. For example, the elastomer a may be dissolved in a solvent such as toluene or benzene followed by mechanical coating such as roll, bar or air-knife coating, or it may be heated in the absence of any medium to form a hot melt which is in turn coated as such or by extrusion. It should be noted that the drying temperature in the mechanical coating and the temperature up to which the elastomer is heated in the absence of any medium are preferaby less than 290° C. in view of the decomposition of the polymer.

The aspect (ii) of the present invention will now be explained in detail. When the paper substrate is coated at a temperature of less than 290° C. by extrusion, the adhesion of the elastomer a to the paper substrate is often insufficient. In this case, it is possible to bond the polyolefinic elastomer a to the paper substrate by providing an additional step of previously coating the side of the substrate on which the elastomer is to be applied with a component which shows good adhesion to the elastomer and paper, for example, a copolymer of polyethylene or ethylene/acrylic acid, an ethylene copolymer of ethylene/acrylate etc.; however, such a problem can successfully be solved by simultaneous co-extrusion of the release layer A and the reinforcing interlayer B for increasing the adhesion between the layer A and the substrate. It is then required that the co-extrusion be effected such that the layer A is located on the interlayer B disposed on the substrate.

As the resin material b forming the interlayer B, use is preferably made of polyethylene derivatives such as low-density polyethylene, ethylene acrylic acid copolymers, ethylene acrylate copolymers or ionomers. These resin materials are preferably coated by extrusion at a temperature of 260° to 330° C. in view of the adhesion-improving effect, the extrusion processing, etc. In a word, the co-extrusion is preferably effected such that the side of the polyolefinic elastomer a forming the release layer A is maintained at a temperature of less than 290° C., while the side of the resin b forming the reinforcing interlayer B is maintained at a temperature of 260° to 330° C. This ensures that good release property and satisfactory adhesion relative to the substrate are obtained at the same time. It will be understood that the thickness of the films coated, i.e., the layers A and B is preferably 10 to 40 microns in total.

The thickness of the release layer to be formed is an important factor that greatly influences its release property and must, therefore, be at least one micron. With the release layer having a thickness of less than one micron, it is impossible to obtain good releasability although the layer may provide a morphologically uniform film.

According to the present invention, the pressure sensitive adhesive layer F is then formed to prepare the pressure sensitive adhesive products. In case of the pressure sensitive adhesive tape, the pressure sensitive adhesive f is coated on the release layer A or the surface of the substrate opposite thereto, dried and shaped into a tape roll. The pressure sensitive adhesive sheet is prepared by applying the pressure sensitive adhesive f directly on the release layer A in the release sheet or on a surface material followed by drying and laminating another surface material or release sheet to the resultant mass. The pressure sensitive adhesive double coated tape may be prepared by various methods depending upon the coating equipment and purpose, for instance, by applying the pressure sensitive adhesive f one or two release layers and winding it upon itself to form a tape roll upon drying, or applying the adhesive f on one of the release layers followed by drying, optinally laminating a core material onto said one release layer, optionally applying an additional amount of the adhesive f on the core material and upon drying, winding it upon itself to form a tape roll.

It should be understood that the pressure sensitive adhesive f is preferably of the emulsion or hot-melt type, and may be applied is known manner. The pressure sensitive adhesive of the emulsion type may be applied by mechanical coating such as roll, bar or air-knife coating, whereas that of the hot-melt type may be applied by hot-melt coating. Preferably, the adhesive is dried at 90° to 130° C.

The pressure sensitive adhesive articles may be prepared by previously applying the pressure sensitive adhesive f on separate release paper and upon drying, transferring the resulting paper to the surface material in the pressure sensitive adhesive sheet of the present invention, the surface of the backing substrate opposite to that coated with the release layer A, or the surface of the release layer of the double coated tape. In this case, the pressure sensitive adhesive layer F in the double coated tape prepared in this manner may include therein a plastic or non-fabric core sheet. Such transferring may be carried out in various fashion depending upon the coating equipment and purpose.

The aspect (iii) of the present invention will now be explained in detail. It has already been ascertained that the problems attendant with the use of silicone can substantially be solved by employing the polyolefinic elastomer alone as the release layer; however, there are still some problems to solve. That is to say, the polyolefinic elastomer a which is independently used as the release layer is disadvantageous in that:

(a') it is poor in heat resistance;

(b') its satisfactory release property has a tendency toward dropping due to heat aging; and (c') it provides a coated film having a strength insufficient for use in the release layer.

When the polyolefinic elastomer is independently used, some problems are encountered in processing the pressure sensitive adhesive products during the production thereof, these problems being concretely referred to as below:

(d') Using extrusion coating so as to apply the release layer on the substrate often causes blocking to occur between the chill roll of an extrusion laminator and the resin to be coated by extrusion. This results in difficulties being encountered in processing of the products.

(e') The release layers may be formed on both sides of the substrate in the course of manufacturing the pressure sensitive adhesive double coated tape. The double-faced release sheet having the release layers on its both surfaces may then be reeled so that one release layer is permitted to be in contact with the other release layer. If both release layers are formed of the polyolefinic elastomer in this case, blocking will be apt to take place between both release layers.

As a consequence of extensive studies carried out for the purpose of eliminating the aforesaid problems, it has been found that the problem (b') associated with the prior art can virtually be settled by using for the release layer a resin mixture (a+c) of a polyethylene c with the polyolefinic elastomer a having a shearing modulus of less than $2.0 \times 10^8$ dyne/cm$^2$ according to JIS K 7213 test and surface wettability expressed in terms of an equilibrium contact angle of more than 55° with respect to a standard liquid having a surface tension of 50 dyne/cm and used in JIS K 6768 test, and employing for the adhesive layer the pressure sensitive adhesive f composed mainly of polyacrylates.

It has now been found that a desired level of releasability between a low-density polyethylene and the polyolefinic elastomer a can easily be obtained by adjustment of a ratio of the polyolefinic elastomer a to the polyethylene c added thereto, said level being not inexpensively attained on a technical scale in the prior art. Surprisingly, it has been found that a combination of the polyolefinic elastomer a with the polyethylene c at a predetermined ratio has a synergistic effect to maintain the release property to such a higher level that could not be attained by separate use of polyolefinic elastomer a and the polyethylene c. The aforesaid problems (a', c'-e') that could not be solved by use of the polyolefinic elastomer a alone are found to be settled by a mixture of the elastomer a with the polyethylene c for the release layer. Another feature of the release agent (a+c) of the present invention is that it can be prepared at very low cost, but it still possesses the virtually same release property as that of silicone. It has unexpectedly been found that the aforesaid synergistic effect renders it possible to use a mixture of the elastomer a with the polyethylene c for one release surface having a lower degree of releasability; in other words, sufficient differences in the releasability between both release surfaces are also attained by using said mixture in place of silicone. Namely, a difference in the releasability between both release surfaces can be controlled by varying a ratio of the polyolefinic elastomer a to the polyethylene c added thereto, thus permitting preparation of the pressure sensitive adhesive double coated tape free from all the problems as discussed hereinbefore.

It will be noted that the polyolefinic elastomer a/polyethylene c mixture may be applied on one release surface having a lower degree of releasability, while the polyolefinic elastomer a alone may be applied on the other release surface having a somewhat higher degree of releasability.

In some cases, the polyacrylate-based pressure sensitive adhesive f has a particularly high coherent strength but a low bond strength. In this case, satisfactory results are obtained by applying on one release surface having a lower degree of releasability the polyolefinic elastomer a alone and applying on the other release surface having a somewhat high degree of releasability the elastomer a/polyethylene c mixture at a varied mixing ratio.

Detailed explanation will now be given to the aspect (iv) of the present invention.

When the backing substrate is paper, cloth or the like material, poor adhesion is obtained between the substrate and the release layer A composed of the polyolefinic elastomer a and formed thereon by extrusion coating as discussed hereinbefore. Accordingly, it was required that the resin forming the reinforcing interlayer B be simultaneously coated thereon by co-extrusion. The same is true of the case where the elastomer a/polyethylene c mixture is applied on the paper or cloth backing. In other words, the adhesion between the substrate and the release layer is slightly improved but is still poor.

In order to make a good bonding between the release layer (A+c) and the backing, extensive investigations were carried out with respect to the method for applying the release layer (A+c), i.e., coating it onto the backing by extrusion. As a result, it has been found that this can also be achieved by simultaneous co-extrusion coating of the resin b forming the reinforcing interlayer B for increasing the adhesion between the release layer (A+c) and the backing. In this case, it is a prerequisite that the co-extrusion be effected such that the polyacrylate-based pressure sensitive adhesive f be kept in contact with the resin mixture (a+c), and the latter be coated onto the backing through the reinforcing interlayer B.

That is to say, the present invention underlies the fact revealed with respect to the polyolefinic elastomer a as well as the additional fact as mentioned just above, and is further characterized in that the resin mixture (a+c) of the polyethylene c with the polyolefinic elastomer a having a predetermined shearing modulus and predetermined surface wettability is used for the release layer, and that the pressure sensitive adhesive layer F is limited to that comprising polyacrylates as a main component.

Another feature of this aspect according to the present invention is that more unique products are obtained by co-extrusion coating of the release layer (A+c) and the reinforcing interlayer B during the formation of the former.

Thus, the present invention provides novel pressure sensitive adhesive products free from all the problems as discussed hereinbefore and of great practical value that could not be obtained in the prior art.

FIGS. 23 to 38 are enlarged sectional views of typical embodiments of the pressure sensitive adhesive products having a release layer A+c comprising a polyolefinic elastomer/polyethylene mixture a+c according to the present invention.

Figure 23:
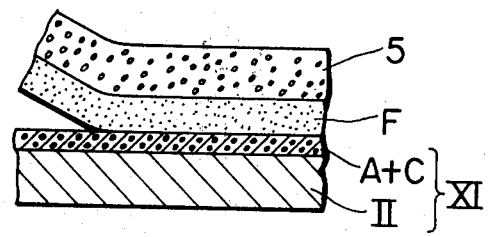
FIGS. 23 to 38 are enlarged sectional views of typical embodiments of the pressure sensitive adhesive products having a release layer A+c comprising a polyolefinic elastomer/polyethylene mixture a+c according to the present invention.
Figure 24:
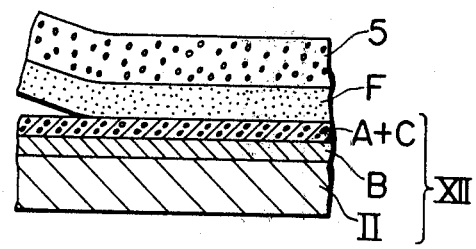
Figure 25:
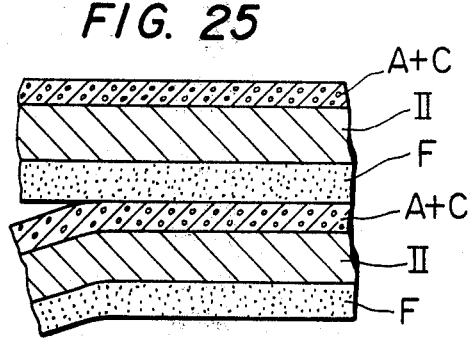
Figure 26:
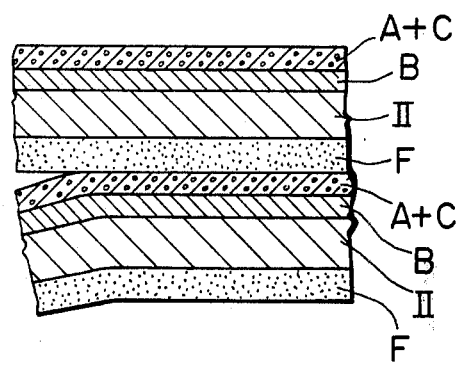

FIGS. 23 and 24 are enlarged sectional views of the pressure sensitive adhesive sheets having a release layer A+C according to the present invention, and FIGS. 25 and 26 are similar views of the pressure sensitive adhesive tapes. FIGS. 23 and 24 illustrate the embodiments wherein no reinforcing interlayer B is needed, whereas FIGS. 25 and 26 are those wherein the interlayer B is required to improve the adhesion between the release layer and the substrate II.

Figure 27:
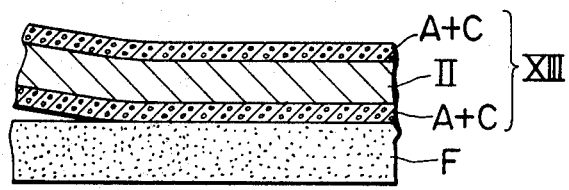
Figure 28:
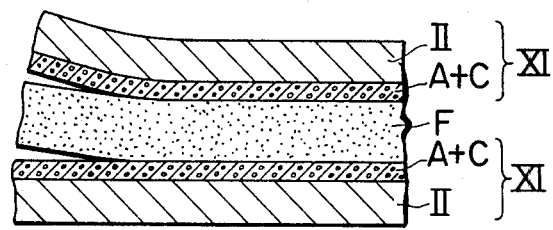

FIGS. 27 to 38 are enlarged sectional views of typical embodiments of the pressure sensitive adhesive double coated tapes having a release layer A+C according to the present invention. FIG. 27 illustrates the pressure sensitive adhesive double coated tape including a double faced release sheet having on its both sides the release layers A+C according to the present invention, which is designed such that, when it is wound upon itself to form a roll, the release layers A+C are kept in contact with both sides of the adhesive layer F so as to achieve the specific combination in accordance with the present invention. That is to say, this figure is an enlarged sectional view of the adhesive tape in which the substrate II is coated on its both sides with the release layers A+C comprising the polyolefinic elastomer/polyethylene mixture a+c, the open side of one of said layers being coated with the polyacrylate-based pressure sensitive adhesive layer F. FIG. 28 shows the pressure sensitive adhesive double coated tape including two release sheets each having on its one side a release layer A+C, which is designed such that the release layers A+C are kept in contact with both sides of the pressure sensitive adhesive layer F so as to achieve the specific combination in accordance with the present invention. Namely, FIG. 28 is an enlarged sectional view of the double coated tape in which the substrate II is on its one side with the release layer A+C comprising the polyolefinic elastomer/polyethylene mixture a+c are in which the layers A+C are kept in contact with both sides of the polyacrylate-based pressure sensitive adhesive layer F.

Figure 29:
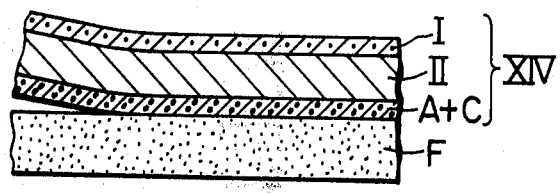

FIG. 29 illustrates the pressure sensitive adhesive double coated tape comprising a backing substrate II having on its both sides release layers, one being a release layer A+C according to the present invention and the other being a silicone release layer I, which tape is designed such that, when it is shaped into a roll, one side of the pressure sensitive adhesive layer F comes in contact with the release layer A+C and the other side is in contact with the silicone release layer I. Thus, FIG. 29 is an enlarged sectional view of the double coated tape in which the substrate II is on its one side with the release layer and on the other side with the silicone release layer I to form a release sheet, and in which the release layer in the release sheet comes in contact with the polyacrylate-based pressure sensitive adhesive layer F.

Figure 30:
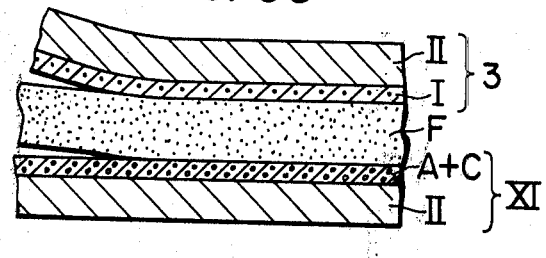
Figure 31:
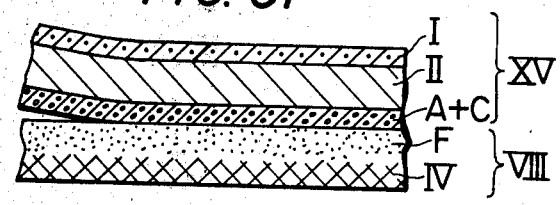
Figure 32:
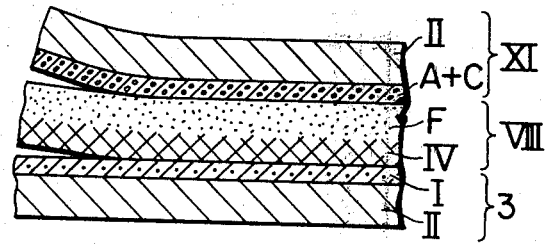

FIG. 30 illustrates the pressure sensitive adhesive double coated tape prepared by allowing a release layer A+C according to the present invention to come in contact with one side of a pressure sensitive adhesive layer F and a silicone release layer I to come in contact with the other side. Thus, this figure is an enlarged sectional view of the double coated tape in which the release layer A+C comprising a polyolefinic elastomer/polyethylene mixtures and coated onto one side of a backing substrate II is allowed to come in contact with one side of the polyacrylate-based pressure sensitive adhesive layer F and the silicone release layer I formed on the other side of the substrate II is allowed to be in contact with the other side of the layer F. FIG. 31 is a similar view of FIG. 29, provided that the pressure sensitive adhesive layer of FIG. 29 is composed of an integral layer VIII comprising the polacrylate layer F and a non-polyacrylate layer IV, and that the silicone layer I is permitted to be in contact with the non-polyacrylate layer IV. FIG. 32 is a similar view of FIG. 30, except that the pressure sensitive adhesive layer F of FIG. 30 is formed of an integral layer VIII comprising the polyacrylate layer F and a non-polyacrylate layer IV, and that the silicone layer I is permitted to be in contact with the non-polyacrylate layer IV.

Figure 33:
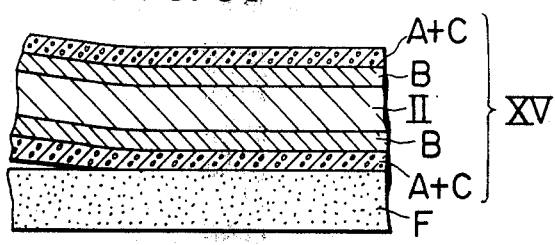
Figure 34:
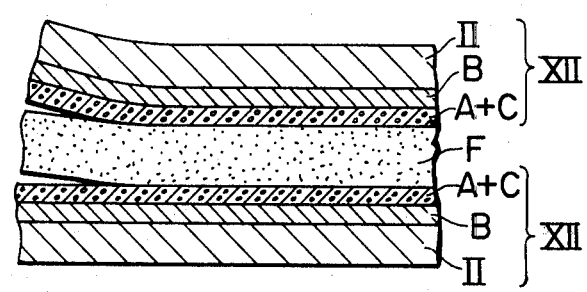
Figure 35:
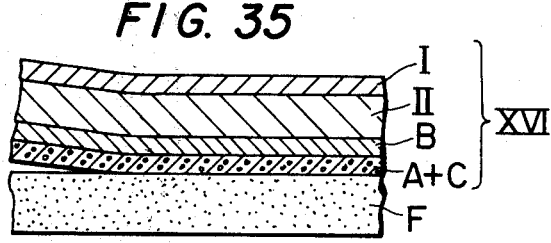
Figure 36:
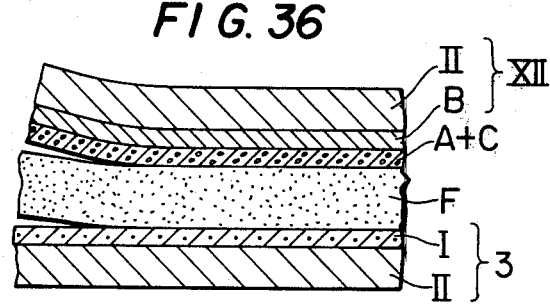
Figure 37:
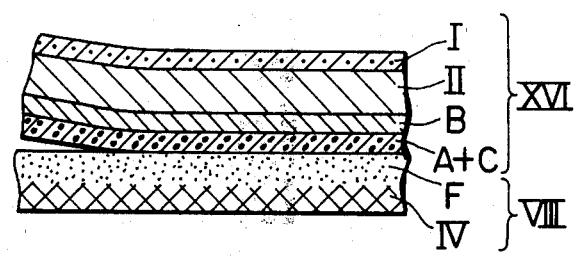
Figure 38:
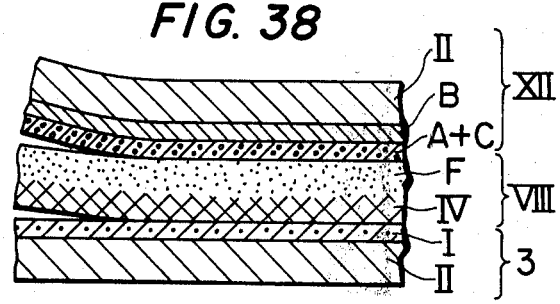

FIG. 33 is a similar view of FIG. 27, provided that a reinforcing interlayer B is provided between the release layer A+C according to the present invention and a backing substrate II.

Between FIGS. 34 and 28, FIGS. 35 and 29, FIGS. 36 and 30, FIGS. 37 and 31 and FIGS. 38 and 32, there are the same relationships as between FIGS. 33 and 27; FIGS. 34, 35, 36, 37 and 38 are enlarged sectional views similar to the corresponding views.

In the drawings, the reference marks have the following means:

A+C: Release Layer Comprising Polyolefinic Elastomer and Polyethylene Mixture

F: Polyacrylate-Based Pressure Sensitive Adhesive Layer

XI: Release Sheet Wherein The Substrate II Is Coated Its One Side With The Release Layer A+C According To The Present Invention.

B: Reinforcing Interlayer

XII: Release Sheet Wherein The Substrate II Is Coated On Its Side With Release Layer A+C According To The Present Invention Through Reinforcing Interlayer B According To The Present Invention XIII: Double Faced Release Sheet Wherein The Substrate II Is Coated On Its Both Sides With Release Layers A+C According To The Present Invention XIV: Release Sheet Wherein The Substrate II Is On Its One Side With Release Layer A+C Of The Present Invention And On The Other Side With Silicone Release Layer I VIII: Pressure Sensitive Adhesive Layer Composed Of Polyacrylate-Based Pressure Sensitive Adhesive Layer F And Non-Polyacrylate-Based Pressure Sensitive Adhesive Layer IV XV: Double Faced Release Sheet Wherein The Substrate II Is Coated On Its Both SIdes With Release Layers A+C According To The Present Invention Through Reinforcing Interlayer B Of The Present Invention XVI: Double Faced Release Sheet Wherein Substrate II Is Coated On Its One Side With Release Layer A+C Of The Present Invention Through Reinforcing Interlayer B Of The Present Invention And On The Other Side With Silicone Release Layer I IV: Non-Polyacrylate-Based Pressure Sensitive Adhesive Layer According to the aspect (iii) of the present invention, the polyolefinic elastomer a having a shearing modulus of less than $2.0 \times 10^8$ dyne/cm$^2$ (JIS K 7213) and surface wettability expressed in terms of an equilibrium contact angle of more than 55° (JIS K 6768) is used as a main component for the release layer A, and the polyethylene c used as a secondary component. These components are mixed together to form a resin mixture a+c that serves as the release layer A+c.

The polyolefinic elastomer a having a shearing modulus and an equilibrium contact angle that do not fall under the range as defined above possesses unsatisfactory releasability. The smaller the shearing modulus and the greater the contact angle, the higher the releasability will be. Accordingly, it is suitable to use the above-defined polyolefinic elastomers as described hereinbefore in connection with the aspect where the polyolefinic elastomer a is used alone. Thus, the polyolefinic elastomer a used in the aspect (iii) may be of the same composition as described hereinbefore.

The polyethylene c used as a secondary component for the release layer A+c according to the aspect (iii) of the present invention is suitably a polyethylene having an average molecular weight of greater than 10,000 and a density of 0.91 to 0.97 g/cm$^3$. A polyethylene having a smaller average molecular weight, i.e., so-called polyethylene wax is not suitable since it provides a coating film of poor strength and is lacking in heat resistance.

The polyethylene c may be a low- or high-density polyethylene; however, preference is given to the lowdensity polyethylene since it excels in releasability, processability, etc.

The polyethylene c added to the polyolefinic elastomer a is preferably a polyethylene having a melt index very close to that of the latter. The ratio of the polyolefinic elastomer a to the polyethylene c added thereto may be chosen according to the purpose, and is preferably in the range of 80:20 to 20:80. The relationship between the mixing ratio and the properties, inter alia, the extrusion coating property of the release layer is mentioned below:

(1) As the amount of the polyolefinic elastomer a increases, the release property increases, amounts to the maximum value and approaches to that of the polyolefinic elastomer a.

(2) The amount of the polyethylene c increases with rises in heat resistance.

(3) The release property of the polyolefinic elastomer a/polyethylene c mixture in a mixing ratio of around 50:50 is not influenced by heat aging.

(4) The amount of the polyethylene c increases with rises in strength.

(5) As the amount of the polyethylene c increases, blocking is substantially reduced during the extrusion coating with resulting increases in processability.

In accordance with the aspect (iii) of the present invention, the polyacrylate-based pressure sensitive adhesive f is exclusively used as the pressure sensitive adhesive layer as in the case where only the polyolefinic elastomer a is used. The reason for exclusively using the polyacrylate-based sensitive adhesive is based on the facts found as a consequence of studies made on the relationship between the kind of pressure sensitive adhesives and the release property of the release layer A-c comprising a mixture of the elastomer a with the polyethylene c.

(1) The release property varies largely depending upon the kind of pressure sensitive adhesives.

(2) The pressure sensitive adhesives based on natural rubber or vinyl ether provide releasability by far lower than do the mixture of the polyolefinic elastomer a with the polyethylene c.

(3) The satisfactory release property that the mixture possesses is particularly obtained in the case of using the pressure sensitive adhesive f based on polyacrylates.

The same referred to hereinbefore also holds in this aspect. For example, the pressure sensitive adhesive layer F in the pressure sensitive adhesive double coated tape of the aspect (III) according to the present invention may or may not contain therein a core sheet. When one of the two groups of release A+c/adhesive F systems per unit of the pressure sensitive adhesive double coated tape is based on the present invention, the surface of the pressure sensitive adhesive layer according to the present invention may be formed of the adhesive f composed mainly of the polyacrylic acid ester, whereas the opposite surface may be constructed from adhesives not containing the polyacrylates. The core sheet which may be used in the present invention is formed of paper, nonwoven fabric, cloth, non-stretched and (uniaxially or biaxially) stretched polymer films and expanded sheets thereof, metal foils, inorganic fiber sheets, carbon fiber sheets, metal fiber sheets or a composite system thereof.

Concrete embodiments of the aspect (iii) using a resin mixture of the polyolefinic elastomer a and the polyethylene c will now be explained in detail. According to this aspect, the polyethylene c is first added to the polyolefinic elastomer a by the conventional methods including, e.g., the use of a tumbler. The release layer A+c is then formed on the substrate by means of, more particularly extrusion coating. The temperature at which the release layer A+c is formed, i.e., the temperature of the resin extruded is preferably in a range of 200°–290° C. rather than a range of 290° to 330° C. adapted in the conventional method. This is because the release property of the release layer A+c is closely corelated to the extrusion temperature, and the lower the extrusion temperature, the more excellent the release property will be.

The aspect (iv) of the present invention will now be explained in detail. When the release layer A+c comprising a mixture of the polyolefinic elastomer a and the polyethylene c is coated onto a substrate at a temperature of 200° to 290° C., the reinforcing interlayer B may or may not be used. Such an interlayer is used in case of a paper or cloth substrate, but is not necessary for the case where a polyolefinic film, a polyester film or a metal foil is used as the substrate. When the paper or cloth substrate is directly coated by extrusion with the release layer A+c, extremely unfavorable adhesion between the release layer and the substrate is obtained; however, such a problem can successfully be settled by simultaneous co-extrusion of the release layer A+c and the reinforcing interlayer B for improving the adhesion between the release layer and the substrate, as described in connection with the case where the polyolefinic elastomer a is exclusively used.

It will be noted that the concrete conditions for the provision of the interlayer B to the resin mixture a+c is here omitted since they are quite identical with those for the case where the polyolefinic elastomer a is independently used.

Turning now to the aspect (iii), it is required that the thickness of the release layer A+c be on the order of at least 1 micron. With the release layer having a thickness of less than one micron, it is impossible to obtain good releasability although the layer may provide a morphologically uniform film.

It will be noted that the methods and conditions for forming the pressure sensitive adhesive layer F so as to prepare the pressure sensitive adhesive sheets, tapes or double coated tapes are here omitted since they are quite identical with those for the case described in connection with the aspect using the polyolefinic elastomer a alone.

The present invention will now be concretely explained with reference to the examples; however, it will be understood that the invention is not limited thereto unless they depart from the scope of the appended claims.

Unless specifically stated in the following examples, the shearing modulus was measured under the conditions of 23±2° C. and 50±5% RH according to JIS K 7213 test and the equilibrium contact angle was done with respect to a standard liquid having a surface tension of 50 dyne per cm and comprising a liquid of formaldehyde and ethylene glycol monoethyl ether mixed at a volume ratio of 90.7 to 9.3 and employed according to JIS K 6768 test.

EXAMPLE 1

A release layer composed mainly of an ethylene -1-butene random copolymer having a shearing modulus of $5.7\times 10^7$ dyne/cm$^3$ and wettability expressed in terms of an equilibrium contact angle of 64° was extruded and coated to a thickness of 30 microns onto a sheet of low-density polyethylene-coated paper on the release layer side (sample S). This sample was then coated on its release layer side with polyacrylate-based pressure sensitive adhesive of the emulsion type (solid content; 40%) usually adapted for use in the pressure sensitive adhesive sheets by means of a 75 micron applicator bar. The resultant sample was let alone at room temperature for 20 seconds and was observed to determine the repellency of the adhesive. As a result, it was found that a good pressure sensitive adhesive film free of any repellency was obtained.

COMPARATIVE EXAMPLE 1

With respect to the release sheet for ordinary pressure sensitive adhesive sheets in which silicone (cross-linked dimethyl siloxane) is used as the release layer (sample T), the coating properties of the adhesive were examined according to Example 1. As a result, it was found that unsatisfactory pressure sensitive adhesive films having a great degree of repellency were formed.

EXAMPLE 2

A sheet of paper coated with polyacrylate-based pressure sensitive adhesive having a relatively large bond stength (hereinafter referred simply to as the adhesive-coated paper p which was found to have a tackiness of 540 g/10 mm (N.T.P.) measured according to JIS Z 1523) was laminated to the surface of the release layer of sample S obtained in Example 1 by means of a rubber roller to form a pressure sensitive adhesive sheet. Thereupon, this sheet was let alone for 24 hours at 20° C. and 65% RH under a pressing load of 100 g/cm, and was estimated on its releasability by measuring the peel strength thereof at 20° C., 65% RH, a peel angle of 180° and a peel rate of 10 m/min.

EXAMPLE 3

A sheet of paper coated with natural rubber-based pressure sensitive adhesive having a relatively large bond strength (hereinafter referred simply to as the adhesivecoated paper having a tackiness of 280 g/10 mm (N.T.P.)) was used in place of the adhesive-coated paper p to form a pressure sensitive adhesive sheet and then measure the releasability thereof according to Example 2.

COMPARATIVE EXAMPLE 2

A sheet of paper coated with polyacrylate-based pressure sensitive adhesive having a relatively small bond strength (hereinafter referred simply to as the adhesive-coated paper r having a tackiness of 280 g/mm (N.T.P.)) was used in place of the adhesive-coated paper p of Example 2 to form a pressure sensitive adhesive sheet and then estimate the releasability thereof according to the method of Example 2.

COMPARATIVE EXAMPLE 3

The adhesive-coated paper q was laminated to the surface of the release layer of sample T prepared according to Comparative Example 2 to form a pressure sensitive adhesive sheet which was in turn estimated on its releasability according to the method as mentioned above.

EXAMPLE 4

A release layer containing as a main ingredient a copolymer of ethylene/propylene having a shearing modulus of $2.0 \times 10^7$ dyne/cm$^2$ and an equilibrium contact angle of 70° was coated to a thickness of 30 microns onto a sheet of lowdensity polyethylene-coated paper on the polyetylene side. Thereafter, the adhesive-coated paper p was laminated to form an adhesive sheet which was then estimated on its releasability according to the aforesaid method.

EXAMPLE 5

The adhesive-coated paper q was employed in place of the adhesive-coated paper p to form a pressure sensitive adhesive sheet. Thereafter, its releasability was estimated according to the aforesaid method.

COMPARATIVE EXAMPLE 4

The adhesive-coated paper r was employed in place of the adhesive-coated paper p of Example 4 to form a pressure sensitive adhesive sheet. Thereafter, this sheet was estimated on its releasability according to the aforesaid method.

COMPARATIVE EXAMPLE 5

The adhesive-coated paper p was laminated to a paper-backed adhesive tape base containing as a release layer a low-density polyethylene having a shearing modulus of $5.1 \times 10^8$ dyne/cm$^2$ and an equilibrium contact angle of 62° to form a pressure sensitive sheet which was then estimated on its releasability according to the aforesaid method.

The results of Examples 2 to 5 and Comparative Examples 2 to 5 are summarized in Table 1.

TABLE 1

| | Adhesive sheet Composition of Release Layer | Composition of Adhesive Layer | Releasability Evaluation | peel strength | Remarks |
|---|---|---|---|---|---|
| Ex. 2 | Polyolefinic elastomer composed mainly of random copolymer of ethylene-1-butene | (a) Based on polyacrylate, High adhesion type | ⊚ | 480g/ 20km | Polyolefin release layer having shearing modulus of $5.7 \times 10^7$ dyne/cm$^2$ and contact angle of 64° |
| Ex. 3 | Polyolefinic elastomer composed mainly of random copolymer of ethylene-1-butene | (b) Based on polyacrylate High adhesion type | ⊚ | 490 | Polyolefin release layer having shearing modulus of $5.7 \times 10^7$ dyne/cm$^2$ and contact angle of 64° |
| Comparative Ex. 2 | Polyolefinic elastomer composed mainly of random copolymer of ethylene-1-butene | (c) Based on natural rubber Low adhesion type | X (poor releasability) | 1,100 | Polyolefin release layer having shearing modulus of $5.7 \times 10^7$ dyne/cm$^2$ and contact angle of 64° |
| Comparative Ex. 3 | Silicone (cross-linked dimethyl polysiloxane) | (b) Based on polyacrylate High adhesion type | X (excessive releasability) | 9 | Known release layer |
| Ex. 4 | Polyolefinic elastomer composed mainly of copolymer of ethylene/propylene | (a) Based on polyacrylate, High adhesion type | ⊚ | 170 | Polyolefin release layer having shearing modulus of $2.0 \times 10^7$ dyne/cm$^2$, density of 0.88 g/cm$^3$, brittle |

TABLE 1-continued

| Adhesive sheet Composition of Release Layer | Composition of Adhesive Layer | Releasability Evaluation | peel strength | Remarks |
|---|---|---|---|---|
| Ex. 5 Polyolefinic elastomer composed mainly of copolymer of ethylene/propylene | (b) Based on polyacrylate High adhesion type | X (poor releasability) | 380 | temperature of lower than $-70°$ C., hardness of 20 and melting point of 38° C. Polyolefin release layer having shearing modulus of $2.0 \times 10^7$ dyne/cm$^2$, density of 0.88 g/cm$^2$, brittle temperature of lower than $-70°$ C., hardness of 20 and melting point of 38° C. |
| Comparative Ex. 4 Polyolefinic elastomer composed mainly of copolymer of ethylene/propylene | (c) Based on natural rubber Low adhesion type | X (somewhat poor releasability) | 1,000 | Polyolefin release layer having shearing modulus of $2.0 \times 10^7$ dyne/cm$^2$, density of 0.88 g/cm$^3$, brittle temperature of lower than $-70°$ C., hardness of 20 and melting point of 38° C. |
| Comparative Ex. 5 Low-density polyethylene | (a) Based on acrylate, High adhesion type | (somewhat poor releasability) | 720 | Known release layer having shearing modulus of $5.1 \times 10^2$ dyne/cm$^2$ and contact-angle of 62° |

⊚: very good ○: good △: somewhat poor X: poor

EXAMPLE 6

Several samples J, K, L, M and N having different shearing moduli were selected from polyolefic elastomers composed mainly of ethylene/alpha-olefin copolymers, and applied as release layers having a thickness of 30 microns onto sheets of polyethylene coated paper on their polyethylene surface by means of extrusion coating (extrusion temperature: 260° C.). Thereafter, each of the resulting products was laminated on its release layer surface with a sheet of polyacrylate-based pressure sensitive adhesive-coated paper (tackiness: 500 g/10 mm according to JIS Z 1523) to form a pressure sensitive adhesive sheet which was then estimated on its releasability according to the aforesaid method.

Figure 39:
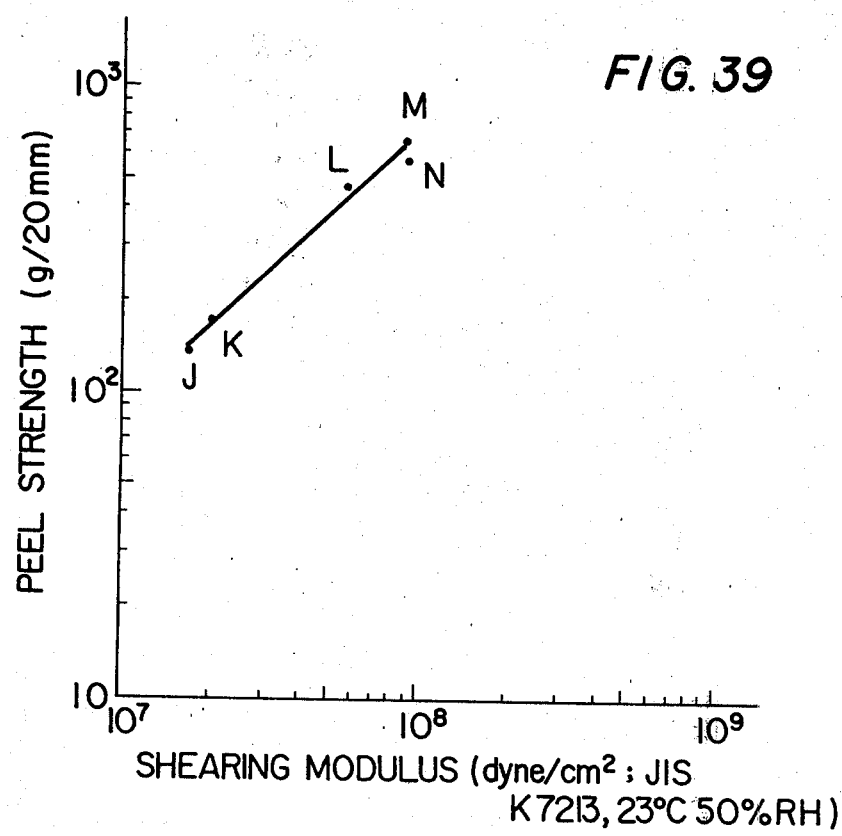

The results are set forth in FIG. 39.

EXAMPLE 7

Release layers prepared from a polyolefinic elastomer composed mainly of an ethylene/propylene copolymer and having an equilibrium contact angle of 72°, 69° or 68° was coated to a thickness of 30 microns onto a sheet of polyethylene-coated paper, said elastomer having a shearing modulus of $2 \times 10^8$ dyne/cm$^2$. Thereafter, the releasability was examined in the same manner as in Example 6.

COMPARATIVE EXAMPLE 6

A release layer having an equilibrium contact angle of 53° was prepared in the same manner as in Example 7, and estimated on its releasability.

The results of Example 7 and Comparative Example 6 are set forth in Table 2.

TABLE 2

| | Equilibrium contact Angle | Releasability (Peel Strength) |
|---|---|---|
| Example 7 | 72°, 69°, 68°, | ⊚140g/20mm ⊚180 ○170 |
| Comparative Ex. 6 | 53° | X 910 |

EXAMPLE 8

The same polyolefinic elastomer as in Example 7 was applied onto the polyethylene-coated paper by means of solution coating, and dried at 150° C. for 2 minutes to form a release layer having a thickness of 6 or 22 microns. Thereafter, such a layer was estimated on their releasability in the same manner as in Example 6.

COMPARATIVE EXAMPLE 7

The releasability of a release layer having a thickness of 0.4 microns was determined in the same manner as in Example 8.

The results of Example 8 and Comparative Example 7 are shown in Table 3.

TABLE 3

| | Thickness of Release Layer | Releasability (Peel Strength) |
|---|---|---|
| Ex. 8 | 22 | 290 g/20mm |
| | 6 | 450 |
| Comparative Ex. 7 | 0.4 | 980 |

EXAMPLE 9

A release layer composed mainly of an ethylene-1-butene random copolymer having a shearing modulus of $5.7 \times 10^7$ dyne/cm$^2$ and wettability expressed in terms of an equilibrium contact angle of 64° was applied to a thickness of 30 microns onto a sheet of low-density polyethylene-coated paper on the polyethylene side by means of extrusion coating. Thereafter, the emulsion type of polyeacrylatebased pressure sensitive adhesive was applied in an amount of 50 g/m$^2$ (solid content), and dried at 110° C. for 1 minute to form a pressure sensitive adhesive tape. Assessments were made on the extensibility as well as the ink receptible, superposable and non-slipping characteristics of this tape. The results are shown in Table 4.

COMPARATIVE EXAMPLE 8

A release layer of silicone (crosslinked dimethyl polysiloxane) was applied to a thickness of 0.5 microns onto a sheet of low-density polyethylene-coated paper on the polyethylene side. Thereafter, the method of Example 9 was repeated to form a pressure sensitive adhesive tape, which was estimated on its various characteristics. The results are shown in Table 4.

TABLE 4

| | Extensibility | Superposable property | Ink-receptible property | Non-slipping property |
|---|---|---|---|---|
| Ex. 9 | O | ◎ | ◎ | ◎ |
| Comparative Ex. 8 | ◎ | X | X Repelling of ink occurs | X |

EXAMPLE 10

Example 9 was repeated to form a tape, provided that in place of the polymer composed mainly of a random copolymer of ethylene-1-butene use was made of a polymer composed mainly of a mixed system of an ethylene/propylene copolymer and ethylene-1-butene random copolymer and having a shearing modulus of $3 \times 10^7$ dyne/cm$^2$ and wettability expressed in terms of an equilibrium contact angle of 67°. The tape was tested and the same results as described in Example 9 were obtained.

EXAMPLE 11

The release layer of the same composition as described in Example 1 and the reinforcing interlayer comprising low-density polyethylene were simultaneously co-extruded and coated onto a sheet of paper of high quality (weight: 80 g/cm$^2$) providing a backing substrate in the pressure sensitive adhesive sheet by means of a co-extruder to form a release sheet of a release layer/reinforcing interlayer/substrate system. The resin froming the release layer was extruded at a temperature of 270° C. prevailing at the outlets of die lips of the extruder, and the resin forming the reinforcing interlayer extruded at 310° C. The release layer and the interlayer were coated to a thickness of 15 and 20 microns, respectively. Thereafter, a sheet of paper to which the pressure sensitive adhesive based on polyacrylates had been coated was laminated to the sheet for the formation of a pressure sensitive adhesive sheet as shown in FIG. 8. This sheet was allowed to stand for one day at 20° C. The release sheet was stripped by hand from the adhesive sheet. The result showed that the release sheet could satisfactorily be peeled from between the pressure sensitive adhesive layer and the release layer without causing the substrate and the interlayer to be separated or segregated through voids from the interlayer and the release layer, respectively.

COMPARATIVE EXAMPLE 10

With the use of a single extruder, the same resin for the release layer as described in Example 11 was coated by extrusion onto the same substrate as in Example 11 to form a release sheet of a release layer/substrate system. The extrusion temperature was 270° C., and the coating thickness was 25 microns. Thereafter, the method of Example 11 was repeated to prepare a pressure sensitive adhesive sheet which was then subjected to a hand-peeling test. The result revealed that the substrate was separated or segregated through voids from the release layer so that the release sheet could not favorably be peelded from between the release layer and the pressure sensitive adhesive layer.

EXAMPLE 12

Example 9 was repeated except that a polyethylene film was used as the backing substrate in place of a sheet of polyethylene-coated paper to prepare a pressure sensitive adhesive tape having the properties substantially equivalent to those of the tape of Example 1.

EXAMPLE 13

Use was made of a resin mixture consisting of 50 parts by weight of the polyolefinic elastomer (i.e., a polymer composed mainly of an ethylene/propylene copolymer having a shearing modules of $2.0 \times 10^7$ dyne/cm$^2$, an equilibrium contact angle of 70°, a density of 0.88 g/cm$^3$, a brittle temperature of less than $-70°$ C. and a melting point of 38° C. and manufactured and sold by Mitsui Sekiyu Kagaku K.K. under the trade name Tafmer PO 180) and 50 parts by weight of a low-density polyethylene having a shearing modulus of $5.1 \times 10^8$ dyne/cm$^2$ and a density of 0.918 g/cm$^3$, said polyethylene being manufactured and sold by Mitsubishi Yuka K.K. under the trade name Ecalon LK -30. This mixture was coated by extrusion to a thickness of 30 microns onto a sheet of polyethylene-coated paper serving as a backing substrate to prepare a release layer. Thereupon, the pressure sensitive adhesive based on polyacrylates was applied to the layer to form a pressure sensitive tape. Evaluation was then made on the extensibility, superposable property, ink-receptible property and nonslipping property of the tape as well as the peel strength of the tape back. The results are summarized in Table 5 to be given hereinafter.

EXAMPLE 14

Only the polyolefinic elastomer of Example 13 was extruded and coated onto a backing substrate at 260° C. to form a release layer. Thereafter, the method of Example 13 was repeated to prepare a tape which was then examined on its properties. The results are set forth in Table 5.

COMPARATIVE EXAMPLE 11

Only the lower-density polyethylene of Example 13 was extruded and coated onto a backing substrate at 260° C. to form a release layer. Thereafter, the method of Example 13 was repeated to prepare a pressure sensitive adhesive tape with its properties being summarized in Table 5.

COMPARATIVE EXAMPLE 12

After providing a silicone release layer onto the surface of polyethylene substrate of Example 13, the method of Example 13 was repeated to prepare a similar tape with its properties being given in Table 5.

COMPARATIVE EXAMPLE 13

To prepare a similar tape according to Example 13, pressure sensitive adhesive based on natural rubber was used in place of that based on polyacrylates. For the properties of the tape, see Table 5.

EXAMPLE 15

A resin mixture of 75 parts by weight of the polyolefinic elastomer-Tafmer PO 180 and 20 parts by weight of a high-density polyethylene having a density of 0.957 g/cm$^3$ (manufactured and sold by Showa Yuke K.K. under the trade name Showlex F 6 120V) was prepared to produce a pressure sensitive adhesive tape according to Example 13. For the properties thereof, see Table 5.

EXAMPLE 16

A resin mixture of 50 parts by weight of the polyolefinic elastomer (i.e., a polymer having a shearing modulus of $5.7 \times 10^7$ dyne/cm$^2$ and an equilbrium contact angle of 64° and composed mainly of anethylene-1 -butene copolymer) and 50 parts by weights of a low-density polyethylene commercially available from Mitsubishi Yuka K.K. under the trade name Yukalon LK 30 was prepared to form a pressure sensitive adhesive tape according to Example 13. For the properties thereof, refer to Table 5.

Table 5 shows the results of Examples 13 to 16 and Comparative Examples 11 to 13.

TABLE 5

| | Pressure Sensitive adhesive tape | | Extensibility of tape* | Superpasable property | Ink-receptible property | Non-slipping property | Peel strength to the tape back** | |
| --- | --- | --- | --- | --- | --- | --- | --- | --- |
| | Release layer | Adhesive layer | | | | | 20° C. 100g/cm$^2$ 24hr Aging | 70° C. 100g/cm$^2$ 24hr Aging |
| Ex. 13 | Mixture of polyelefinic elastomer and low-density polyethylene | Polyacrylate | | | | | g/20mm 86 | g/20mm 120 |
| Ex. 14 | Polyolefinic elastomer alone | " | | | | | 120 | 210 |
| Comparative Ex. 11 | Low-density polyethylene alone | " | | | | | 700 | 670 |
| Comparative Ex. 12 | Silicone | " | | unsatisfactory (excessive relecisability) | unsatisfactory | unsatisfactory | 8 | — |
| Comparative Ex. 13 | The same as Ex. 1 | Natural rubber | X | — | — | — | — | — |
| Ex. 15 | Mixture of polyolefinic elastomer and high-density polyethylen | Polyacrylate | | | | | | |
| Ex. 16 | Mixture of polyolefinic elastomer and low-density polyethylene | " | | | | | — | — |

: good   : somewhat poor   X: poor
*The tape was stretched at 10 to 50m/min to determine its releasability and observe splitting of the sabstrate.
**The peel strength was measured at a peel angle of 180°, a rate of 0.5m/min, 20° C. and 65% RH.

EXAMPLE 17

With the aid of a co-extruder, the same resin $a_1 + c$ forming the release layer as described in Example 13 and the resin composed of a low-density polyethylene and forming the reinforcing interlayer B were simultaneously coated onto a sheet a paper of fine quality serving as a backing substrate to prepare a release sheet of a release layer/reinforcing interlayer/substrate system. The resin $a_1 + c$ was extruded at a temperature of 270° C. prevailing at the outlet of die lips of the ectruder, and the resin for the reinforcing interlayer extruded at 310° C. The release layer $A_1 + c$ and the reinforcing interlayer were coated to a thickness of 10 and 20 microns, respectively. Thereafter, a sheet of polyacrylate-coated paper was applied to prepare a pressure sensitive adhesive sheet as shown in FIG. 24. This sheet was allowed to stand for one day at 20° C., and was subjected to a hand peeling test in which the release sheet was peeled by hand. The release sheet was found to be satisfactorily peeled from between the adhesive layer and the release layer $A_1 + c$ without causing the substrate and the interlayer to be separated or segregated through voids from the interlayer and the release layer, respectively.

COMPARATIVE EXAMPLE 14

Using a single extruder, the resin $a_1 + c$ for the release layer as described in Example 17 was extruded and coated onto the same sheet substrate as that of Example 17 to form a release sheet of a release layer $A_1 + c$/substrate system. The extrusion temperature was 270° C., and the coating thickness was 30 microns. Thereupon, the method of Example 17 was repeated to prepare a pressure sensitive sheet which was then subjected to a hand peeling test. The test result indicated that the release sheet could unfavorably be peeled from between the adhesive layer and the release layer $A_1 + c$ due to the fact that a separation took place between the substrate and the release layer.

EXAMPLE 18

To prepare a pressure sensitive adhesive tape with its properties being virtually equivalent ot those of the tape obtained in Example 13, Example 13 was repeated except that a polyethylene film was used in place of a sheet of polyethylenecoated paper.

EXAMPLE 19

To obtain a pressure sensitive adhesive double coated tape having two release layers on its both surfaces, the polyolefinic elastomer was co-extruded and coated to a thickness of 25 microns onto both sides of a sheet of paper having a polyethylene coated on its both sides (hereinafter referred to as the polyethylene double coated paper) at an extrusion temperature of 265° C. to prepare two release layers, said elastomer being a polymer containing as a main component an ethylene/propylene copolymer having a shearing modulus of $2.0 \times 10^7$ dyne/cm$^2$, an equilibrium contact angle of 70°, a density of 0.88 g/cm$^3$, a brittle temperature of lower than −70° C. and a melting point of 38° C. commercially available from Mitsui Sekiyu Kagaku K.K. under the trade name Tafmer PO 180.

Onto the surface one of the release layers was applied a polyacrylate-based pressure sensitive adhesive of the emulsion type for the double coated tape to form a pressure sensitive adhesive double coated tape. The adhesive layer used then contained a sheet of Japanese paper (weight: 12g/cm²) acting as a core sheet.

With respect to one of two groups of the release layer/adhesive layer systems that were first peeled from each other, evaluation was carried our on the extensibility of the tape, the peel strength, the changes in the peel strength with the lapse of time and the influence that the release layer has on the adhesive layer as to the adhesion therebetween (hereinafter referred to as the residual adhesion). The results are summarized in Table 6.

EXAMPLE 20

To prepare a similar tape, Example 19 was repeated except that the polyolefinic elastomer was used as the release layer, said elastomer being a polymer containing as a main component a random copolymer of ethylene-1-butene having a shearing modulus of $5.7 \times 10^7$ dyne/cm² and an equilibrium contact angle of 64°. For the properties thereof, see Table 6.

EXAMPLE 21

To prepare a pressure sensitive adhesive double coated tape having two release layers kept in contact with both surface of a pressure sensitive adhesive layer, use was made of a resin mixture of 50 parts by weight of the polyolefinic elastomer (i.e., a polymer containing as a main component an ethylene/propylene copolymer having a shearing modulus of $2.0 \times 10^7$ dyne/cm², an equilbrium contact angle of 70°, a density of 0.88 g/cm³, a brittle temperature of lower than $-70°$ C. and a melting point of 38° C. and commercially available from Mitsui Sekiyu Kagaku K.K. under the trade name Tafmer PO 180, and 50 parts by weight of a low-density polyethylene having a shearing modulus of $5.1 \times 10^8$ dyne/cm² and a denstiy of 0.918 g/cm³ and commercially available from Mitsubishi Yuka K.K. under the trade name Yucalon LK-30. This mixture was extruded and coated to a thickness of 25 microns onto both surfaces of a sheet of polyethylene double coated paper serving as a backing substrate to form release layers. To the surface of one of the release layers was applied the pressure sensitive adhesive based on polyacrylates to provide a pressure sensitive adhesive layer. The resultant pressure sensitive adhesive double coated tape was wound upon itself to form a tape roll.

It should be noted that the pressure sensitive adhesive layer thus formed contained a sheet of Japanese paper (weight: 12 g/m²) as a core sheet.

With respect to one of two groups of the release layer/adhesive layer systems that were first peeled from each other, evaluation was carried out on the extensibility of the tape, the peel strength, the changes in the peel strength with the lapse of time, and the residual adhesion. For the results, refer to Table 6.

EXAMPLE 22

To prepare a similar tape, Example 21 was repeated except that use was made of a resin mixture consisting of 80 parts by weight of the polyolefinic elastomer-Tafmer PO 180 and 20 parts by weight of a high-density polyethylene having a density of 0.957 g/cm³ and commercially available from Showa Sekiyu K.K. under the trade name Showlex F 6 120 V. For the properties of the tape, see Table 6.

EXAMPLE 23

To prepare a similar tape, Example 21 was repeated except that use was made of a resin mixture of 60 parts by weight of the polyolefinic elastomer (i.e., a polymer containing as a main component a random copolymer of ethylene-1-butene having a shearing modulus of $5.7 \times 10^7$ dyne/cm² and an equilibrium contact angle of 64° and 40 parts by weight of a low-density polyethylene commercially available from MITSUBISH YUKA K.K. under the trade name Yucalon LK-30. For the properties of the obtained tape, see Table 6.

COMPARATIVE EXAMPLE 15

Only the low-density polyethylene of Example 21 was extruded and coated onto the substrate at 260° C. to form release layers, and thereupon a similar tape was prepared according to Example 21. For the properties of the tape, refer to Table 6.

COMPARATIVE EXAMPLE 16

After a silicone release layer for release paper was applied to a polyethylene substrate of Example 19, a similar tape was prepared according thereto. For the properties thereof, see Table 6.

COMPARATIVE EXAMPLE 17

A silicone release layer added with a release-controlling agent was applied to the polyethylene substrate of Example 21. A similar tape was prepared according to Example 21 with its properties being set forth in Table 6.

COMPARATIVE EXAMPLE 18

To prepare a similar tape, Example 21 was repeated except that the pressure sensitive adhesive based on natural rubber was used in place of that based on polyacrylates. For the properties of the tape, see Table 6.

TABLE 6

|   |   | Release layer kept in contact with adhesive layer | | Extensibility of tape Note: 1 | Peel strength Note: 2 | | | Residual adhesion Note: 3 | Residual adhesion Note: 4 |
|---|---|---|---|---|---|---|---|---|---|
|   |   | Release layer | Adhesive layer |   | Number of days elapsed | Number of 1 day elapsed | Number of 2 days elapsed |   |   |
| Ex. | 19 | Polyolefinic elastomer alone | polyacrylate |   | 50 | 49 | 49 | 735 | 250 |
|   | 20 | Polyolefinic elastomer alone | polyacrylate |   | 62 | 61 | 62 | 710 | 240 |
|   | 21 | Mixture of polyolefinic elastomer and low-density polyethylene | polyacrylate |   | 35 | 32 | 32 | 750 | 255 |
|   | 22 | Mixture of polyolefinic elastomer and high-density polyethylene | polyacrylate |   | 40 | 38 | 38 | 760 | 250 |
|   | 23 | Mixture of | polyacrylate |   | 60 | 57 | 57 | 730 | 255 |

TABLE 6-continued

| | | Release layer kept in contact with adhesive layer | | Extensibility of tape Note: 1 | Peel strength Note: 2 | | | Residual adhesion Note: 3 | Residual adhesion Note: 4 |
|---|---|---|---|---|---|---|---|---|---|
| | | Release layer | Adhesive layer | | Number of days elapsed | Number of 1 day elapsed | Number of 2 days elapsed | | |
| Comparative Ex. | | polyolefinic elastomer and low-density polyethylene | late | | | | | | |
| | 15 | Low-density polyethylene alone | polyacrylate | Δ | 350 | 350 | 340 | 700 | 245 |
| | 16 | Silicone | polyacrylate | X too low | 5 | 2 | 2 | 650 | 160 |
| | 17 | Silicone added with release-controlling agent | polyacrylate | | 60 | 30 | 14 | 610 | 115 |
| | 18 | The same as Ex. 21 | Natural rubber | splitting | — | — | — | — | — |

: good  Δ: somewhat poor  X: poor

Note 1: The release layer was peeled from the pressure sensitive adhesive layer at a peel rate of 10 to 50 mm/min to determine a degree of extension and observe the occurrence of splits in the substrate.

Note 2: The peel strength between the release layer and the pressure sensitive adhesive layer was determined at a peel angle of 180°, a peel rate of 0.5 m/min, at 20° C. and 65% RH. The term "days" means the number of days elaspsed from the formation of the release layer until it was kept in contact with the adhesive layer.

Note 3: The residual adhesion is expressed by the adhesion of the pressure sensitive adhesive layer peeled from the release layer with respect to a stainless plate, said adhesion being measured with respect to the products indicated in the column entitled "The Number of Days Elasepsed : O" and according to JIS K 1523. It should be understood that the peel strength and the residual adhesion were determined with the adhesive layer having a sheet of kraft paper (weight: 73 g/m²) laminated to its opposite surface. The adhesion of a part of the adhesive layer kept in no contact with the release layer was 730 g/20mm.

Note 4: A polyethylene plate was used in place of the stainless plate referred to in Note 3.

EXAMPLE 24

The polyolefinic elastomer referred to in Example 19 was extruded and coated to a thickness of 15 microns onto the surface of a sheet of the polyethylene double coated paper serving as a backing substrate to form a release sheet, and silicone for the release sheet was thermally coated onto the other surface. According to Example 19, a pressure sensitive adhesive layer was provided to prepare a pressure sensitive adhesive tape. The adhesive layer then contained no core sheet.

The tape was unwound from a tape roll at a rate of 30 m/min and was then stretched. The result revealed that the silicone layer could satisfactorily be peeled from the adhesive layer without causing the release layer to be segregated through voids from the side of the polyolefinic elastomer of relatively great releasability, in other words, in a state where it was in close contact with the elastomer. When the tape was applied to an application surface, the release layer comprising the polyolefinic elastomer could easily be peeled from the adhesive layer.

COMPARATIVE EXAMPLE 19

This example is a control one with respect to Example 24. Silicone for the release paper was thermally coated to one surface of a sheet of polyethylene double coated paper servin as a backing substrate, and silicone added with a release-controlling agent thermally coated to the other surface. Thereafter, a pressure sensitive adhesive layer was provided to prepare a pressure sensitive adhesive double coated tape according to Example 19. When the tape was unwound from a tape roll at a rate of 30 m/min, satisfactory peeling of the pressure sensitive adhesive layer was not obtained. That is to say, this tape could no longer be used as the double coated tape since the adhesive layer adhered partly to both release layers and became torn.

EXAMPLE 25

The polyolefinic elastomer referred to in Example 19 was extruded to a thickness of 15 microns onto both sides of a sheet of polyethylene double coated paper serving as a backing substrate at an extrusion temperature of 260° C. to form release layers. The pressure sensitive adhesive based on polyacrylates for the pressure sensitive adhesive double coated tape was provided to form a pressure sensitive adhesive layer having a core sheet (of a polyester film having a thickness of 20 microns) at its central region to form a pressure sensitive adhesive double coated tape.

This tape having a length of 50 m was wound upon itself and cut into loop tape pieces having a width of 5 mm. The result indicated that these pieces assumed the normal shape without causing any shifting between the pressure sensitive adhesive layer and the release layers.

COMPARATIVE EXAMPLE 20

This example is a control one with respect to Example 25. Silicone for the release paper was thermally coated onto both surfaces of a sheet of the polyethylene double coated paper serving as a backing substrate. A pressure sensitive adhesive layer was provided to prepare a pressure sensitive adhesive double coated tape according to Example 25. This tape having a length of 50 m was wound upon itself and cut into loop tape pieces having a width of 5 mm which were then allowed to stand for some time. As a consequence, a shifting took place between the pressure sensitive adhesive layer and the release layers so that the tape pieces rose telescopically, thus rendering it impossible to maintain them in the normal form.

EXAMPLE 26

To prepare a pressure sensitive adhesive double coated tape, the resin forming the release layer comprising the same ethylene/propylene copolymer as described in Example 4 and the resin forming the reinforcing interlayer comprising a low-density polyethylene were simultaneously co-extruded and coated onto one surface of a sheet of high quality (weight: 80 g/m²) providing a backing substrate with the use of a co-extruder, thereby preparing a double coated release sheet of a release layer/reinforcing interlayer/substrate system. The same co-extrusion coating was effected on the other surface of the substrate of obtain a double coated release sheet comprising a release layer/interlayer/substrate/interlayer/release layer system.

The resin forming the release layer was extruded at a temperature of 265° C. prevailing at the outlet of die lips of the extruder, and the resin for the reinforcing interlayer extruded at a temperature of 310° C. The release and reinforcing layers were coated to a thickness of 15 microns. Thereafter, the pressure sensitive adhesive based on polyacrylates for the pressure sensitive adhesive double coated tape was kept in contact with the release layers to prepare a pressure sensitive adhesive double coated tape according to Example 19.

This tape was permitted to stand for one day at 20° C. to peel the double coated release sheet by hand. As a result, it was found that the release sheet could satisfactorily be peeled from between the adhesive layer and the release layers without causing the substrate and the interlayers to be separated or segregated through voids from the interlayers and the release layers, respectively.

Similar results were also obtained in the pressure sensitive adhesive double coated tape in which the pressure sensitive adhesive layer was kept in contact with two single coated release layers each comprising a release layer/reinforcing interlayer/substrate system.

COMPARATIVE EXAMPLE 21

For a comparison with respect to Example 26, the resin forming the release layer as described in Example 26 was extruded and coated to the same substrate as that of Example 26 with the aid of a single extruder to prepare a double coated release sheet comprising a release layer/substrate system. The estrusion temperature was 270° C., and the coating thickness was 35 microns. Thereafter, Example 26 was repeated to prepare a pressure sensitive adhesive double coated tape which was then subjected to a hand peeling test. The test result showed that the release sheet could not satisfactorily be peeled from between the adhesive layer and the release layers due to the fact that unfavorable separation took place between the substrate and the release layers.

EXAMPLE 27

Silicone for the release paper was thermally coated onto one surface of polyethylene double laminated paper serving as a backing substrate for the release sheet. A similar release layer was applied to the other surface according to Example 21. A similar pressure sensitive adhesive layer was provided according to the same Example to prepare a pressure sensitive adhesive double coated tape.

Noteworth here is that no core sheet was used in the pressure sensitive adhesive layer.

This tape was stretched by hand and as a result, it was found that the release sheet could satisfactorily be peeled from between the pressure sensitive adhesive layer-silicone layer without causing the adhesive layer to be separated through voids form the side of the release layer comprising a resin mixture of the polyolefinic elastomer and the polyethylene, namely, in a state where it was in close contact with the release layer.

When this tape was laminated to an application surface, the release layer comprising the resin mixture could easily be peeled from the adhesive layer.

EXAMPLE 28

To prepare a pressure sensitive adhesive double coated tape as shown in FIG. 30, Example 27 was repeated except that the polyethylene surfaces of two sheets of polyethylene single laminated paper serving as a backing substrate for the release sheet were subjected to the same release treatment as described in Example 27.

Similar testing gave the same results as those of Example 27.

EXAMPLE 29

A release layer was provided to one surface of a sheet of polyethylene double coated paper serving as a backing substrate for the release sheet according to Example 21, and the other surface was coated with a release layer in accordance with Example 21. However, the ratio of the polyolefinic elastomer relative to the polyethylene in the layer coated onto said other surface was 40:60 (parts by weight).

Thereafter, a pressure sensitive adhesive layer was provided to prepare a pressure sensitive adhesive double coated tape according to Example 21. This adhesive layer then included at its central region a core sheet of very thin Japanese paper (weight: 9 g/m$^2$)

Similar testing gave the same results as those of Example 27.

The tape having a length of 50 m was wound upon itself and cut into loop tape pieces having a width of 5 mm. After allowing these pieces to stand for one day, it was found that no shifting took place between the adhesive layer-release layer so that they did not collpase.

EXAMPLE 30

To prepare a pressure sensitive adhesive double coated tape as shown in FIG. 39, Example 29 was repeated except that the polyethylene surfaces of two sheets of polyethylene single laminated paper were subjected to the same release treatment as described in Example 29.

Similar testing gave the same results as those of Example 29.

EXAMPLE 31

A release layer was coated onto one surface of a sheet of polyethylene double laminated paper serving as a backing substrate for the release sheet according to Example 21, and only the polyolefinic elastomer of Example 23 was extruded and coated onto the other surface at 260° C. to prepare a release layer. Thereafter, Example 29 was repeated to prepare the pressure sensitive adhesive double coated tape.

Similar testing gave the same results as those of

COMPARATIVE EXAMPLE 22

This example is a control run of Examples 29 and 31. Silicone for the release paper was thermally coated onto both surfaces of a sheet of polyethylene double coated paper serving as a backing substrate. According to Example 29, a pressure sensitive adhesive layer was provided to prepare a pressure sensitive adhesive double coated tape.

This tape having a length of 50 m and cut into loop tape pieces which were then allowed to stand for one day. As a result, a shifting took place between the adhesive layer-release layers so that the tape pieces rose telescopically. It was impossible to maintain the pieces in the normal form.

COMPARATIVE EXAMPLE 23

This example is a control run of Examples 27 to 31. Silicone for the release paper was thermally coated onto one surface of a sheet of polyethylene double coated paper serving as a backing substrate, and only the low-density polyethylene of Example 21 was extruded and coated onto the other surface at a temperature of 260° C. to form release layers. According to Example 29, a pressure sensitive adhesive layer was provided to prepare a pressure sensitive adhesive double coated tape.

This tape was stretched by hand. As a result, it was found that the release layer could satisfactorily be peeled from between the adhesive layer and the silicone layer without causing the adhesive layer to be separated through voids from the release layer comprising the polyethylene, i.e., in a state where it was in close contact with the release layer. In the tape applied to an application surface of paper of high quality, however, the release layer could not be peeled from the pressure sensitive adhesive layer due to the great releasability. When such peeling was effected by force, the paper became torn.

EXAMPLE 32

According to Example 29, release layers were formed on both sides of a sheet of polyethylene double coated paper serving as a backing substrate. The resultant product was wound upon itself to form a tape roll having a length of 50,000 m. The roll was allowed to stand for one week and subjected to unrolling and unwinding tests. Unwinding could satisfactorily be effected without causing blocking.

To carry out similar testing was respect to the release layer prepared according to Example 4, release layers were formed on both surfaces of a sheet of polyethylene double coated paper to wind the resultant product upon itself to form a tape roll having a length of 50,000 m. The results of similar testing showed that blocking was prone to occur between the release layers.

EXAMPLE 33

With the aid of a co-extruder, one surface of a sheet of paper of fine quality was coated with the resin $a_2+c$ of the same composition as described in Example 21 and forming the release layer and the resin comprising a low-density polyethylene and forming reinforcing interlayer by simultaneous co-extrusion to prepare a release layer/reinforcing interlayer/substrate system. On the other hand, the other surface of the substrate was coated with the release layer-forming resin $a_2+c$ having the same composition as described in Example 23 and a greater level of releasability than that of Example 13 and the resin composed of the same low-density polyethylene as described in Example 13 and forming the reinforcing interlayer by simultaneous co-extrusion to prepare a release sheet of a release layer $A_1+c$/reinforcing interlayer/release sheet substrate/reinforcing interlayer/release layer $A_2+c$ system.

The resins $a_2+c$ and $a_1+c$ were extruded at a temperature of 270° C. prevailing at the outlets of die lips of the extruder, and the two resins forming the interlayers extruded at a temperature of 310° C.

The release layer $A_1+c$ and the reinforcing interlayer each had a thickness of 15 microns, while the release layer $A_2-c$ and the reinforcing interlayer coated onto the other surface each had a thickness of 15 microns. Thereafter, two pressure sensitive adhesive layers comprising the pressure adhesive based on polyacrylates were brought in contact with both release layers to prepare a pressure sensitive adhesive double coated tape according to Example 21.

Each of the adhesive layers used contained no core sheet. This tape was allowed to stand for one day at 20° C. and, thereupon, the release sheet was first peeled by hand from one surface thereof. The result indicated that the release sheet could satisfactorily be peeled from between the adhesive layer and the release layer $A_1-c$ without causing the substrate and the interlayer to be separated or segregated through voids from the interlayer and the release layer $A_1+c$, respectively.

Subsequently, the pressure sensitive adhesive layer was applied to an application surface of a glass plate and the other release sheet was peeled from between the adhesive layer and the release layer $A_2+c$. The result showed that the release sheet could well be peeled from between the adhesive layer and the release layer $A_2+c$ without causing the substrate and the interlayer to be separated or segregated through voids from the interlayer and the release layer $A_2+c$.

According to the method as described just above, a pressure sensitive adhesive double coated tape was obtained in which the pressure sensitive layer was brought in contact with the release layers $A_1+c$ and $A_2+c$ coated onto two single faced release sheets and consisting of a release layer $A_1+c$/reinforcing interlayer B/substrate and a release layer $A_2+c$/reinforcing interlayer B/substrate system. The same results were also obtained with respect to this tape.

COMPARATIVE EXAMPLE 24

With the use of a single extruder, the same substrate as described in Example 33 was coated with the same resin $a_1+c$ as that of the same example by extrusion to thereby prepare a release layer $A_1+c$/substrate system. The other surface was similarly coated with the resin $a_2+c$ identical with that of Example 33 by extrusion to prepare a release layer $A_{1+c}$/substrate/release layer$_{A2}+c$ system providing a double faced release sheet.

The resins $a_1+c$ and $a_2+c$ were extruded at a temperature of 270° C. prevailing a the outlets of die lips of the extruder, and each had a thickness of 25 microns.

Thereafter, the pressure sensitive adhesive layers composed of the adhesive based on polyacrylates were brought in contact with both release layers to prepare a pressure sensitive adhesive double coated tape according to Example 33. This tape was allowed to stand for one day at 20° C., and subject to a hand peeling test. The test results indicated that the release sheet could not well be peeled from between the adhesive layer and the release layer due to the fact that the release layers $A_1+c$ and $A_2+c$ were separated or segregated through voids from the substrate.

According to the method as mentioned just above, a pressure sensitive adhesive double coated tape was obtained in which the pressure sensitive adhesive layers were brought in contact with the release layers $A_1+c$ and $A_2+c$ provided on two single faced release sheets and consisting of a release layer $A_1+c$/substrate system and a release layer $A_2+c$/substrate system. The same results were also obtained as described just above. The shearing modulus and contact angle were measured as follows:

1. Shearing Modulus

The polyolefinic elastomer forming the release layer was hot-pressed for 5 minutes at 150° C. under a pressure of about 20 kg/cm², and was cooled as it stood at room temperature to prepare a film sample. The shearing modulus of this sample was determined according to JIS K 7213 under the conditions of 23°±2° C. and 50±5% RH.

2. Contact Angle

The contact angle was determined according to "Droplet Shape Method" described in "The Course of Experimental Chemistry", Vol. 7 Surface Chemistry, third edition, edited by Japan Chemistry Association. As the measuring liquid, use was made of a wettability index standard liquid for JIS K 6768 test, said liquid having a surface tension of 50 dyne/cm and being commercially available from Wako Junyaku K.K. The measuring conditions were 20°±2° C. and 65±5% RH. Hot-pressing was carried out for 5 minutes at 150° C. under a pressure of about 20 kg/cm² to prepare a film sample. This sample was conditioned for 24 hours at 20°±1° C. and 65±5% RH such that it was not contaminated with dust etc. The contact angle was determined by forming a droplet on the film and, after the lapse of ca. five seconds, taking a photograph of the same. The size of the droplet was such that its horizontal length at the bottom was in a range of 1 to 3 mm. With the use of a film projector, the droplet was then enlarged and projected on a screen to determined a forward contact angle ($\theta r$) and a rearward contact angle ($\theta a$). These angles each were determined at six points and the measurements were averaged. The equilibrium contact angle ($\theta_2$) was then calculated from the following equation.

$$\cos \theta_2 = (\cos \theta_a + \cos \theta_r)/2.$$

What is claimed is:

1. Pressure sensitive adhesive products having one or more release layers and a pressure sensitive adhesive layer, in which a release layer comprises a polyolefinic elastomer having a shearing modulus of less than $2.0 \times 10^8$ dyne/cm² according to JIS K 7213 test, surface wettability expressed in terms of an equilibrium contact angle for more than 55° with respect to a standard liquid having a surface tension of 50 dyne/cm and used in JIS K 6768 test under the conditions of 20°±1° C. and 65±5% RH and a thickness of at least 1 micron, and a pressure sensitive adhesive layer contains as a main component a polyacrylate, said release layer being kept in contact with said adhesive layer over a given area to form a composite layer or integral thereof.

2. The pressure sensitive adhesive products as recited in claim 1, in which said polyolefinic elastomer forming said release layer is composed mainly of an ethylene - alpha olefin copolymer having a density of 0.80 to 0.90 g/cm², a brittle temperature of lower than −70° C. according to ASTM D 764 test, a melting point of lower than 80° C. according to differential thermal analysis and a hardness of lower than 80 according to JIS K 6301 test.

3. The pressure sensitive adhesive products as recited in claim 1 or 2, in which said copolymer of ethylene/alpha olefin is a random copolymer of ethylene-1-butene.

4. The pressure sensitive adhesive products as recited in claim 1 or 2, in which said copolymer of ethylene/alpha olefin is a copolymer or ethylene/propylene.

5. The pressure sensitive adhesive products as recited in claim 1 or 2, in which said copolymer of ethylene/alpha olefin is a mixture of a random copolymer of ethylene-1-butene and a copolymer of ethylene/propylene.

6. Pressure sensitive adhesive products having one or more release layer and a pressure sensitive adhesive layer, in which a release layer has a thickness of at least 1 micron and comprises a resin mixture of a polyolefinic elastomer having a shearing modulus of less than $2.0 \times 10^8$ dyne/cm² according to JIS K 7213 test, surface wettability expressed in terms of an equilibrium contact angle of more than 55° with respect to a standard liquid having a surface tension of 50 dyne/cm and used in JIS K 6768 test under the conditions of 20°±1° C. and 65±5% RH and a polyethylene added thereto, and a pressure sensitive adhesive layer contains a polyacrylate as a main component, said release layer being kept in contact with said adhesive layer over a given area to form a composite or integral layer thereof.

7. The pressure sensitive adhesive products as recited in claim 6, in which said polyolefinic elastomer is composed mainly of an ethylene-alpha olefin copolymer having a density of 0.80 to 0.90 g/cm³, a brittle temperature of lower than −70° C. according to ASTM D 764 test and a melting point of lower than 80° C. according to differential thermal analysis.

8. The pressure sensitive adhesive products as recited in claim 7, in which said copolymer of ethylene/alpha olefin is a copolymer of ethylene/propylene.

9. The pressure sensitive adhesive products as recited in claim 7, in which said copolymer of ethylene/alpha olefin is a random copolymer of ethylene-1-butene.

10. The pressure sensitive adhesive products as recited in claim 7, in which said copolymer of ethylene/alpha olefin is a mixture of a random copolymer of ethylene-1-butene and a copolymer of ethylene/propylene.

11. The pressure sensitive adhesive products as recited in claim 6, in which said polyethylene has an average molecular weight of more than 10,000 and a density of 0.91 to 0.97 g/cm³.

* * * * *